US012657299B2

(12) United States Patent
Shahriar et al.

(10) Patent No.: US 12,657,299 B2
(45) Date of Patent: Jun. 16, 2026

(54) RANSOMWARE DETECTION TRAINING USING VARIABLE LEVELS OF ENCRYPTION

(71) Applicant: NetApp, Inc., San Jose, CA (US)

(72) Inventors: Muneem Shahriar, Sunnyvale, CA (US); Mesfin Dema, Allen, TX (US); Arunkumar Gururajan, Sammamish, WA (US); Kiran Doreswamy, Sammamish, WA (US); Joseph Aboukhalil, Menlo Park, CA (US); Gagan Gulati, Sammamish, WA (US); Gaurav Makkar, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/424,212

(22) Filed: Jan. 26, 2024

(65) Prior Publication Data

US 2025/0131088 A1 Apr. 24, 2025

Related U.S. Application Data

(60) Provisional application No. 63/592,406, filed on Oct. 23, 2023.

(51) Int. Cl.
*G06F 21/56* (2013.01)
*H04L 9/40* (2022.01)

(52) U.S. Cl.
CPC .......... *G06F 21/566* (2013.01); *G06F 21/565* (2013.01); *H04L 63/1466* (2013.01); *G06F 2221/034* (2013.01); *G06F 2221/2107* (2013.01)

(58) Field of Classification Search
CPC ................. G06F 21/566; G06F 21/565; G06F 2221/034; G06F 2221/2107; H04L 63/1466
See application file for complete search history.

(56) References Cited

U.S. PATENT DOCUMENTS

| | | | |
|---|---|---|---|
| 10,229,269 B1 * | 3/2019 | Patton | G06F 21/554 |
| 2008/0133561 A1 | 6/2008 | Dubnicki et al. | |

(Continued)

FOREIGN PATENT DOCUMENTS

| | | |
|---|---|---|
| WO | 2019107609 A1 | 6/2019 |
| WO | 2022098612 A1 | 5/2022 |

OTHER PUBLICATIONS

K. Lee, S.-Y. Lee and K. Yim, "Machine Learning Based File Entropy Analysis for Ransomware Detection in Backup Systems," in IEEE Access, vol. 7, pp. 110205-110215, 2019, doi: 10.1109/ACCESS.2019.2931136. (Year: 2019).*

(Continued)

*Primary Examiner* — Robert B Leung

(57) ABSTRACT

Described herein are systems, methods, and software to provide ransomware detection using variable levels of encryption. In one implementation, a computing device identifies a set of files, wherein the set of files each comprise a label indicative of whether the file is representative of a safe file or a file attacked by ransomware, and wherein the set of files comprises unencrypted files, partially encrypted files, and fully encrypted file. The computing device further identifies features associated with the set of files and generates a machine learning model that outputs a determination of whether a new file has been attacked based at least on the features in relation to whether a file in the set of files was labeled as attacked.

20 Claims, 11 Drawing Sheets

(56) References Cited

U.S. PATENT DOCUMENTS

| | | | |
|---|---|---|---|
| 2016/0253498 A1 | 9/2016 | Valencia et al. | |
| 2016/0292418 A1* | 10/2016 | Wojnowicz | G06F 21/562 |
| 2016/0337390 A1 | 11/2016 | Sridhara et al. | |
| 2016/0378984 A1 | 12/2016 | Wojnowicz et al. | |
| 2018/0007069 A1 | 1/2018 | Hunt et al. | |
| 2018/0034835 A1 | 2/2018 | Iwanir et al. | |
| 2018/0048658 A1* | 2/2018 | Hittel | G06F 21/552 |
| 2019/0294792 A1 | 9/2019 | Singh et al. | |
| 2019/0332769 A1* | 10/2019 | Fralick | H04L 9/30 |
| 2020/0034537 A1 | 1/2020 | Chen et al. | |
| 2020/0043474 A1 | 2/2020 | Nguyen et al. | |
| 2020/0401316 A1* | 12/2020 | Hankins | G06F 12/0868 |
| 2021/0042411 A1 | 2/2021 | Annen et al. | |
| 2021/0334374 A1 | 10/2021 | Vasudeva et al. | |
| 2021/0409425 A1 | 12/2021 | Varshney et al. | |
| 2022/0067159 A1* | 3/2022 | Chen | G06F 21/56 |
| 2022/0091943 A1 | 3/2022 | Rao et al. | |
| 2022/0147815 A1 | 5/2022 | Conwell et al. | |
| 2022/0179964 A1* | 6/2022 | Qiao | G06F 18/29 |
| 2022/0374519 A1 | 11/2022 | Botelho et al. | |
| 2023/0063489 A1 | 3/2023 | Balaji et al. | |
| 2023/0063913 A1 | 3/2023 | Balaji et al. | |
| 2023/0119688 A1 | 4/2023 | Huang | |
| 2023/0306108 A1* | 9/2023 | Veprinsky | G06F 21/552 |
| 2024/0013067 A1* | 1/2024 | Azarafrooz | G06F 21/602 |
| 2024/0031400 A1 | 1/2024 | Lee | |
| 2024/0134976 A1* | 4/2024 | Shachar | G06F 16/176 |
| 2024/0193271 A1 | 6/2024 | Liu et al. | |
| 2024/0205256 A1 | 6/2024 | Tormasov et al. | |
| 2025/0094579 A1 | 3/2025 | Rossman et al. | |
| 2025/0131088 A1 | 4/2025 | Shahriar et al. | |
| 2025/0131090 A1 | 4/2025 | Shahriar et al. | |
| 2025/0131091 A1 | 4/2025 | Shahriar et al. | |
| 2025/0133108 A1 | 4/2025 | Dema et al. | |
| 2025/0315523 A1 | 10/2025 | Richmond et al. | |

OTHER PUBLICATIONS

T. McIntosh et al. "The inadequacy of entropy-based ransomware detection." Neural Information Processing: 26th International Conference, ICONIP 2019, Sydney, NSW, Australia, Dec. 12-15, 2019, Proceedings, Part V 26. Springer International Publishing, 2019. (Year: 2019).*

M. Duignan, M. Schukat and E. Barrett, "Detecting Ransomware Encryption with File Signatures and Machine Learning Models," 2023 34th Irish Signals and Systems Conference (ISSC), Dublin, Ireland, 2023, pp. 1-5, doi: 10.1109/ISSC59246.2023.10162047. (Year: 2019).*

C.-M. Hsu, C.-C. Yang, H.-H. Cheng, P. E. Setiasabda and J.-S. Leu, "Enhancing File Entropy Analysis to Improve Machine Learning Detection Rate of Ransomware," in IEEE Access, vol. 9, pp. 138345-138351, 2021, doi: 10.1109/ACCESS.2021.3114148. (Year: 2021).*

Kolter, Jeremy Z et al., "Learning To Detect Malicious Executables In The Wild," ACM, pp. 470-478, 2004.

Lyda, Robert et al., "Using Entropy Analysis To Find Encrypted And Packed Malware," IEEE Computer Society, pp. 40-45, 2007.

Shafiq, M. Zubair et al., "Embedded Malware Detection Using Markov n-Grams," DIMVA 2008, LNCS 5137, pp. 88-107, 2008.

Tabish, S. Momina et al., "Malware Detection Using Statistical Analysis Of Byte-Level File Content," ACM, pp. 23-31, 2009.

Tian, Ronghua et al., "An Automated Classification System Based On The Strings Of Trojan And Virus Families," IEEE, pp. 23-30, 2009.

Wojnowicz, Michael et al., "Suspend: Determining Software Suspiciousness By Non-Stationary Time Series Modeling Of Entropy Signals," Expert Systems With Applications, vol. 71, pp. 301-313, 2017.

* cited by examiner

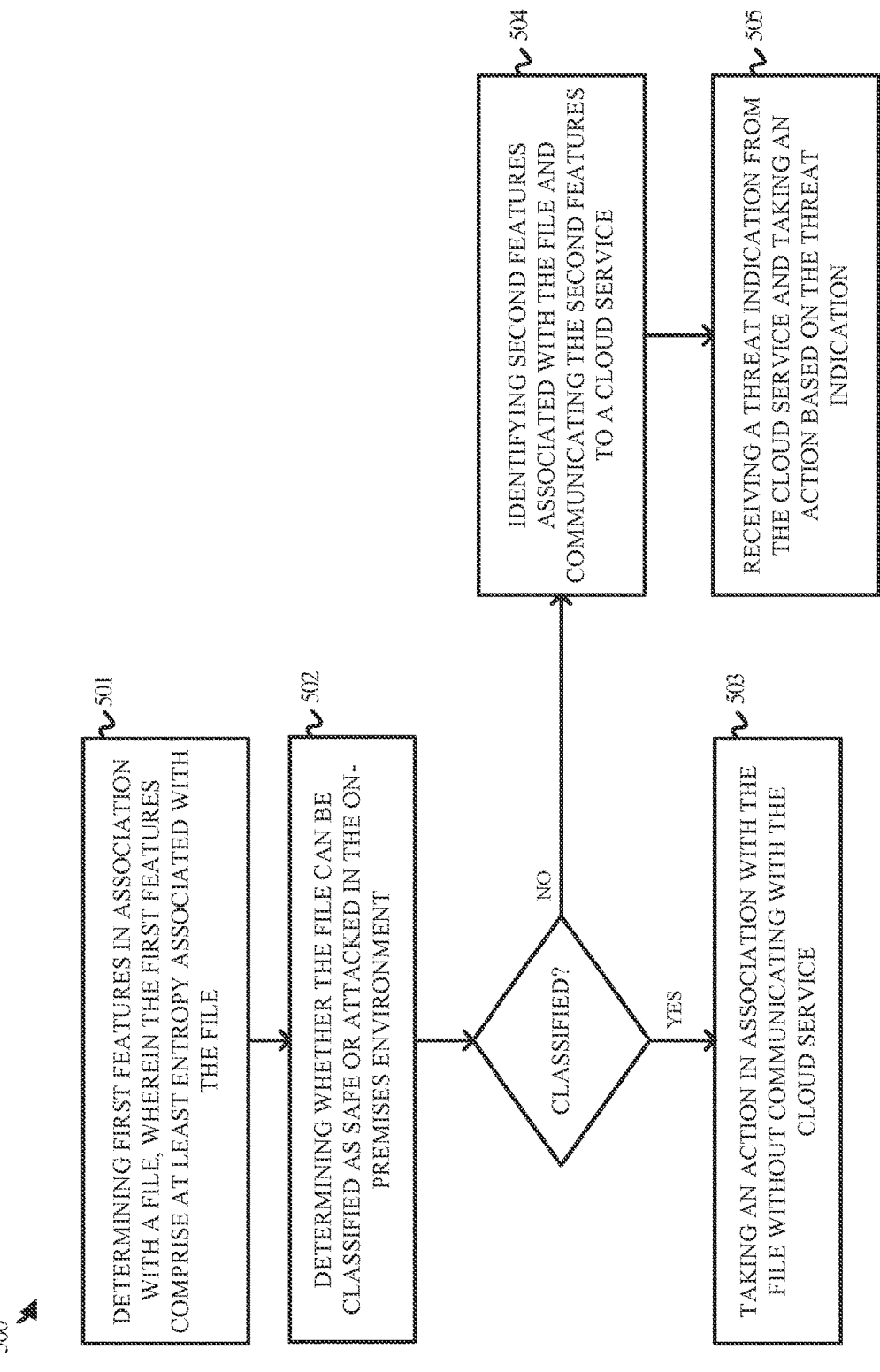

501
DETERMINING FIRST FEATURES IN ASSOCIATION WITH A FILE, WHEREIN THE FIRST FEATURES COMPRISE AT LEAST ENTROPY ASSOCIATED WITH THE FILE

502
DETERMINING WHETHER THE FILE CAN BE CLASSIFIED AS SAFE OR ATTACKED IN THE ON-PREMISES ENVIRONMENT

CLASSIFIED?

NO

YES

503
TAKING AN ACTION IN ASSOCIATION WITH THE FILE WITHOUT COMMUNICATING WITH THE CLOUD SERVICE

504
IDENTIFYING SECOND FEATURES ASSOCIATED WITH THE FILE AND COMMUNICATING THE SECOND FEATURES TO A CLOUD SERVICE

505
RECEIVING A THREAT INDICATION FROM THE CLOUD SERVICE AND TAKING AN ACTION BASED ON THE THREAT INDICATION

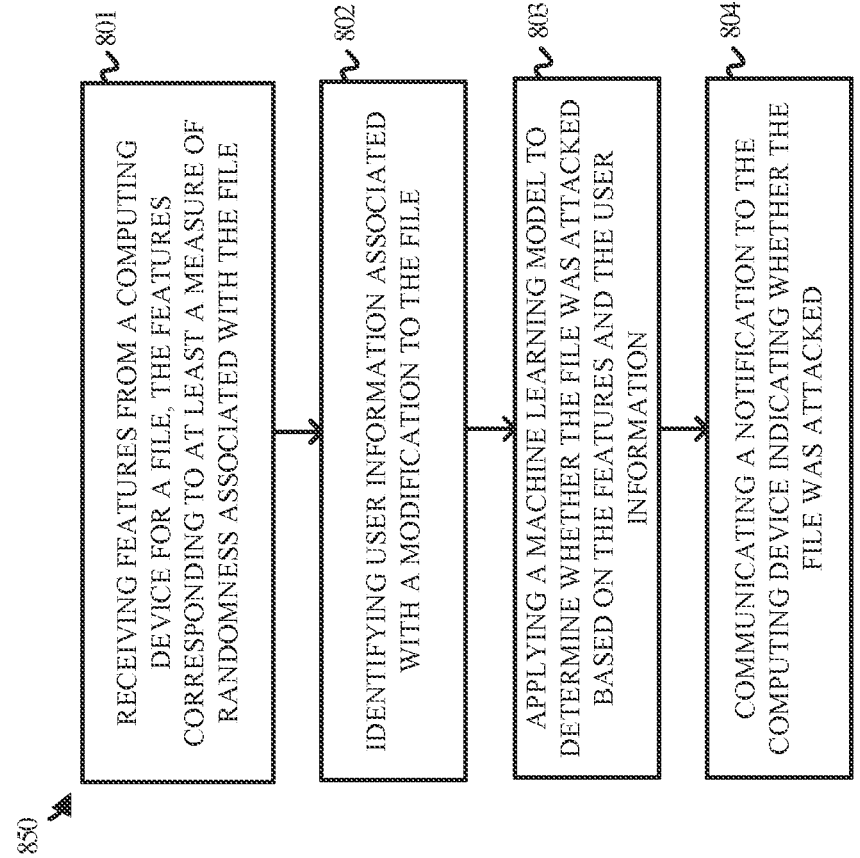

801 RECEIVING FEATURES FROM A COMPUTING DEVICE FOR A FILE, THE FEATURES CORRESPONDING TO AT LEAST A MEASURE OF RANDOMNESS ASSOCIATED WITH THE FILE

802 IDENTIFYING USER INFORMATION ASSOCIATED WITH A MODIFICATION TO THE FILE

803 APPLYING A MACHINE LEARNING MODEL TO DETERMINE WHETHER THE FILE WAS ATTACKED BASED ON THE FEATURES AND THE USER INFORMATION

804 COMMUNICATING A NOTIFICATION TO THE COMPUTING DEVICE INDICATING WHETHER THE FILE WAS ATTACKED

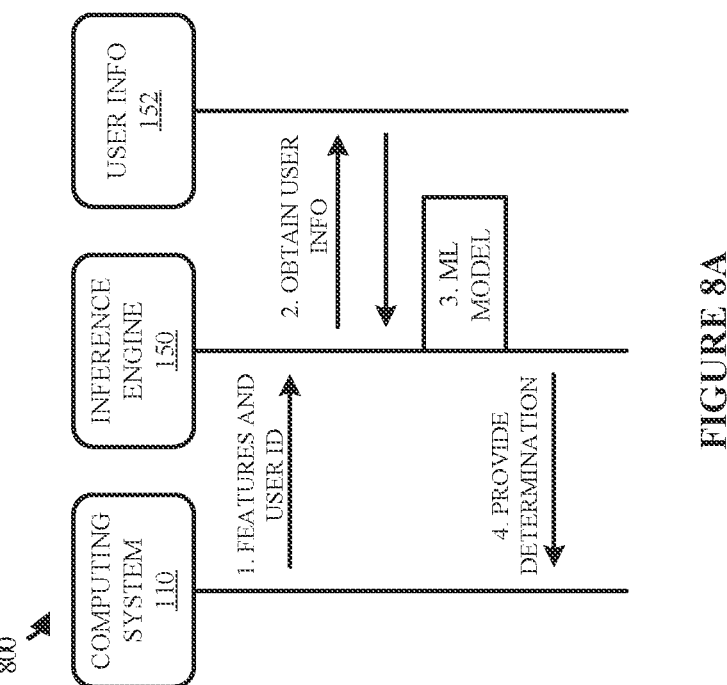

COMPUTING SYSTEM 110

INFERENCE ENGINE 150

USER INFO 152

1. FEATURES AND USER ID

2. OBTAIN USER INFO

3. ML MODEL

4. PROVIDE DETERMINATION

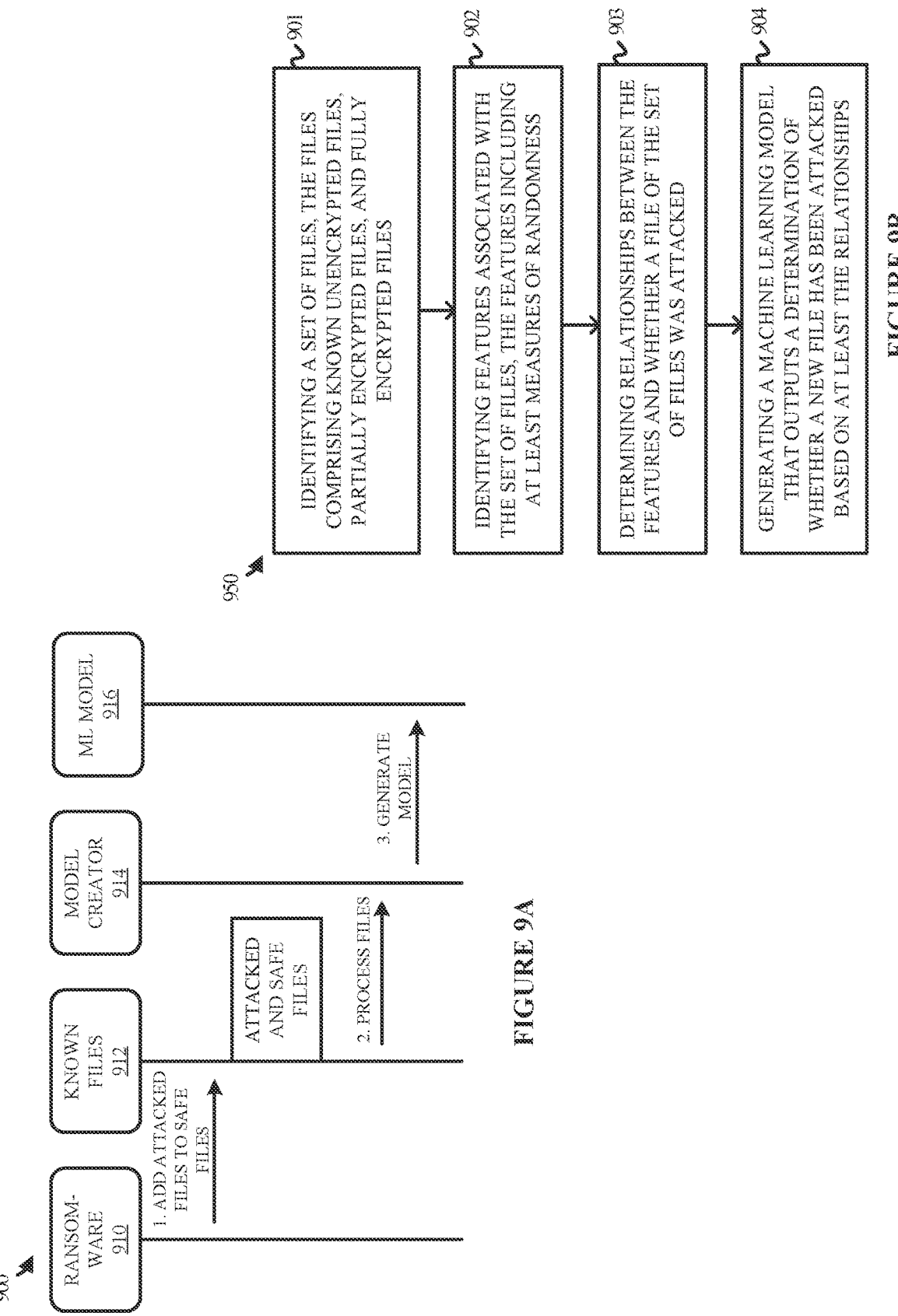

901 IDENTIFYING A SET OF FILES, THE FILES COMPRISING KNOWN UNENCRYPTED FILES, PARTIALLY ENCRYPTED FILES, AND FULLY ENCRYPTED FILES

902 IDENTIFYING FEATURES ASSOCIATED WITH THE SET OF FILES, THE FEATURES INCLUDING AT LEAST MEASURES OF RANDOMNESS

903 DETERMINING RELATIONSHIPS BETWEEN THE FEATURES AND WHETHER A FILE OF THE SET OF FILES WAS ATTACKED

904 GENERATING A MACHINE LEARNING MODEL THAT OUTPUTS A DETERMINATION OF WHETHER A NEW FILE HAS BEEN ATTACKED BASED ON AT LEAST THE RELATIONSHIPS

RANSOM-WARE 910

KNOWN FILES 912

MODEL CREATOR 914

ML MODEL 916

1. ADD ATTACKED FILES TO SAFE FILES

ATTACKED AND SAFE FILES

2. PROCESS FILES

3. GENERATE MODEL

COMPUTING SYSTEM 1000

EXTRACT PROCESS 1024

INFERENCE PROCESS 1025

CRITERIA PROCESS 1026

ACTION PROCESS 1027

STORAGE SYSTEM 1045

PROCESSING SYSTEM 1050

COMMUNICATION INTERFACE 1060

RANSOMWARE DETECTION TRAINING USING VARIABLE LEVELS OF ENCRYPTION

RELATED APPLICATIONS

This application hereby claims the benefit of and priority to U.S. Provisional Patent Application 63/592,406, titled "MULTI-LEVEL RANSOMWARE DETECTION", filed Oct. 23, 2023, and which is hereby incorporated by reference in its entirety for all purposes.

TECHNICAL FIELD

Various embodiments of the present technology relate to the identification and actions against ransomware detected in a computing environment using a tiered assessment approach.

BACKGROUND

Ransomware is a malicious software that encrypts a victim's files and demands a ransom payment in exchange for the decryption key needed to unlock the data. This type of cyberattack is typically carried out by cybercriminals who exploit vulnerabilities in a victim's computer or network security. Once the ransomware infects a system, it encrypts the files, making them inaccessible, and displays a ransom note demanding payment, often in cryptocurrency, in exchange for the decryption key. Ransomware attacks can have devastating consequences for individuals and organizations, causing data loss, financial harm, and significant disruptions to normal operations.

To combat the ransomware, organizations deploy cybersecurity measures such as regular software updates, network security protocols, and user training to prevent ransomware from becoming active in a computing network or a database. However, while these security measures provide a measure of protection for an organization's assets, difficulties arise in efficiently identifying the first signs of a ransomware attack using the limited compute resources of the organization. These issues are compounded when the compute resources, such as processing resources and memory resources, are further used in supporting database services, query services, and other types of services for the organization. Additionally, local software updates for organization systems are deployed at intervals, often preventing computing systems of the organization from possessing the required information to make critical responses to new ransomware.

SUMMARY

The technology disclosed herein provides compute-optimized multi-level ransomware detection via file processing. In one implementation, a method for detecting malicious activity with respect to a file includes conducting a first level of ransomware detection to the file. Conducting the first level of ransomware detection includes identifying features of the file that include a measure of entropy or other measure of randomness, inputting the features to a machine learning model that outputs a determination of whether the file has been attacked, and determining whether to conduct a second level of ransomware detection based on the determination. In some implementations, performing the second level of ransomware detection includes identifying additional features of the file and inputting at least the additional features to a second machine learning model that outputs a second determination of whether the file has been attacked.

The initial determination may be a score that is a value in a range of possible values. In such situations, determining whether to conduct the second level of ransomware detection may be based on the location of the value in the range of possible values.

In some cases, in response to determining not to conduct a second level of ransomware detection, the method initiates an action in association with the file when the determination indicates the file has been attacked. Similarly, in response to determining not to conduct a second level of ransomware detection, the method initiates a different action in association with the file when the determination indicates the file has not been attacked.

Conducting the first level of ransomware detection may occur in an on-premises environment, and whereas conducting the second level of ransomware detection may occur in a cloud environment remote from the on-premises environment. Moreover, the second machine learning model may have a complexity greater than that of the machine learning model used to conduct the first level of ransomware detection.

In one implementation, a method includes extracting a first set of chunks from a file, the first set of chunks each representing a first sized portion of the file. The method further provides for identifying first features in association with the first set of chunks, the first features comprising a measure of randomness associated with the first set of chunks. The method also includes inputting the first features to a machine learning model that outputs a determination of whether the file has been attacked and determining whether to reduce the first sized portion based on the determination.

In one implementation, a method of operating a cloud environment with one or more computing devices includes receiving features of a file from a second computing device remote from the cloud environment, the features comprising at least a measure of randomness for the file and an identifier for a user associated with a modification to the file. The method provides identifying user information associated with a user of the modified the file, applying a machine learning model to determine whether the file was attacked based on the features and the user information, and communicating a notification to the second computing device indicating whether the file was attacked.

In one implementation, a method includes identifying features associated with a training data set, wherein the training data set includes files that are unencrypted, partially encrypted, and fully encrypted, and wherein each of the files includes a label indicative of whether the file is representative of a safe file or a file attacked by ransomware. The method further includes determining relationships between the features and whether a file of the training data set was labeled as attacked, and relationships between the features and whether a file of the training data set was labeled as attacked.

BRIEF DESCRIPTION OF THE DRAWINGS

FIG. 5 illustrates a method of operating a computing device to provide compute optimized multi-level ransomware detection using file processing according to an implementation.

FIG. 8A illustrates a timing diagram of operating a cloud environment to identify ransomware in a file from a local device according to an implementation.

FIG. 8B illustrates a method of operating a cloud environment to identify ransomware in a file from a local device according to an implementation.

FIG. 9A illustrates a timing diagram for using a known dataset in a machine learning environment to generate a machine learning model according to an implementation.

FIG. 9B illustrates a method of using a known dataset in a machine learning environment to identify ransomware features according to an implementation.

DETAILED DESCRIPTION

Figure 1:
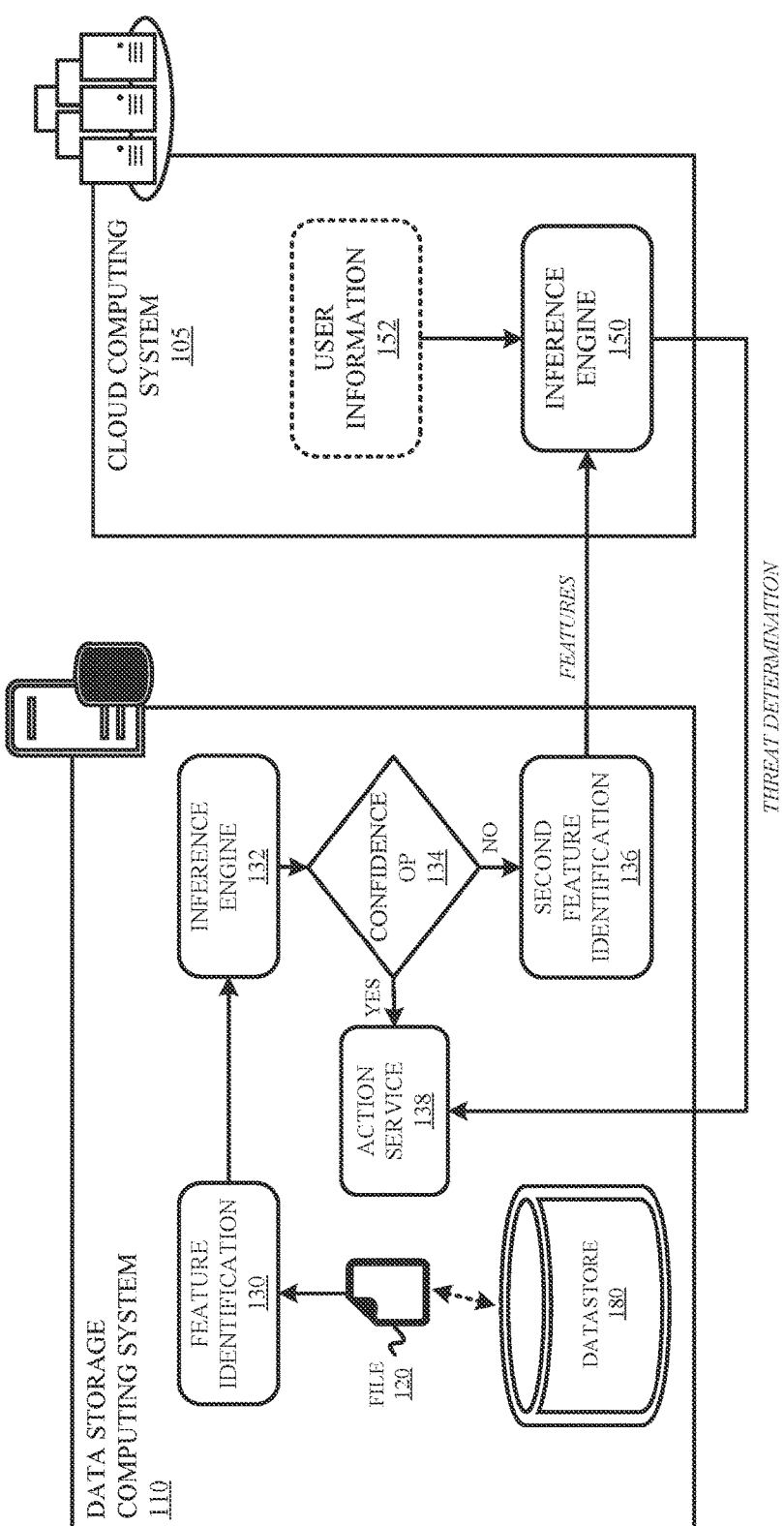
FIG. 1 illustrates a computing environment to provide compute optimized multi-level ransomware detection using file processing according to an implementation.

Ransomware is a type of malware that is designed to block access to data (e.g., using encryption) unless a ransom is paid. Ransomware attacks may originate, for example, from a trojan disguised as a legitimate file opened by a user. These types of attacks pose a critical business risk as ransomware attacks can lead to variety of devastating consequences (e.g., data loss, financial setbacks, damaged reputation, remediation expenses, legal and regulatory issues, increased cyber security premiums, etc.).

Integrating proactive and multilayered approaches to ransomware defense can significantly improve the organization's ability to identify and thwart emerging threats, reducing the risk of successful attacks, and minimizing potential damages. Common approaches often include signature-based detection, behavior-based analysis, heuristics and machine learning, network traffic analysis, user behavior monitoring, and file integrity monitoring. These techniques are deployed locally on the computing system or box, in a limited fashion due to resource constraints, to detect such intrusions. However, such solutions are difficult to keep up-to-date and consume local resources which should be primarily dedicated to the consumer experience.

This innovation provides for a novel Cloud-Connected architecture that leverages the power of the Cloud, for running complex Machine Learning (ML) algorithms for ransomware detection, while leveraging the power of a distributed storage system (e.g., ONTAP™ from NetApp™) running next to the data, for extracting statistical features from the device near real-time. Machine learning is a subfield of artificial intelligence that focuses on developing algorithms and models that enable computers to learn from and make predictions or decisions based on data, without being explicitly programmed for specific tasks. It involves the creation of systems that can improve their performance over time through experience and adaptation to new information.

The architecture described herein leverages the strengths of both on-premises and cloud systems to protect the data estate of the customers from ransomware attacks by devising solutions that improve the Recovery Time Objective (RTO) and Recovery Point Objective (RPO) business metrics while adhering to data privacy regulations. In some implementations, rather than implementing a cloud-based system to provide the complex ML algorithm, second computing hardware (on-premises) or at another data center implements the complex ML algorithm.

Using this new architecture for ransomware detection, content is first inspected locally by a relatively simple model for presence of encryption patterns that are indicative of an encryption attack (high vs. low entropy signals). In addition, a confidence score is produced for the model's result. If the confidence score is high enough, then the result of the first stage is accepted, and the content is either flagged or considered safe. For example, if the system is confident that the file is suspicious, then an alert will be generated indicating the presence of suspicious activities. Otherwise, the file is determined to be clean with high confidence resulting in no action. If the system is not confident in the prediction from the simple ML model, the system will extract a set of complex ML model features from the file and send those features (metadata) to the Cloud for a more detailed analysis. Note that the metadata features that are extracted here are by looking at the file in the form of binaries and it does not reveal any content of the file when the system is extracting the features.

On-Device System

In some implementations, the system on the device can include four unique components: 1) Simple Feature Extraction Unit; 2) Simple ML Model Inference Engine; 3) Decision Unit; and 4) Complex Feature Extraction Unit. The Simple Feature Extraction Unit is responsible for extracting simple file-level information (e.g., measuring statistical features of entropy from the modified blocks, analyzing file header, checking for ransomware extension, etc.). The Simple ML Model Inference Engine enables a distributed storage system to use machine learning to predict the probability that a file is under attack by ransomware (e.g., suspiciously encrypted) or not. The Simple ML Model Inference Engine uses a machine learning model that ingests features of a file and calculate a likelihood (e.g., a score) that the file was attacked. The machine learning model is created using a heuristic process on a knowledge base of safe and attacked files where sets of features are associated with a likelihood that the file was attacked.

The Decision Unit plays a central role in meeting the design objective in optimizing the use of compute resources as well as providing a high probability of ransomware detection. Since the simple ML model generates a value in a range of probability values indicating degree of suspiciousness of a file, the decision unit must decide which of the files processed by the simple ML model needs to be analyzed further in the Cloud. The Decision Unit is optimally configured to filter out files (vast majority of cases) that have been detected confidently (very clean or clearly encrypted) by the simple ML model. For the minority set of files that fall in the gray area or unclassified from the simple ML model inference engine, a second feature extraction phase is required to support the complex ML model in the Cloud. For example, The Simple ML Model Inference Engine in combination with the Decision Unit can include a ML model that classifies 95 percent of files as safe or attacked while using ten percent of the compute resources (memory, processing, and the like) that would be required to classify 100 percent of the files. The files that cannot be processed locally or do not fall in the 95 percent, can be classified using the Cloud System that provides additional compute resources for the complex ML model. Thus, while most of the files are classified locally using first resources, the minority of files that cannot be classified locally are offloaded to the Cloud System. In some examples, the Simple ML Model Inference Engine outputs a value (e.g., zero to one) and the Decision Unit determines whether the value indicates the file is safe, attacked, or unknown based on thresholds. When the file is classified as unknown, further analysis is required from the Cloud System.

The Complex Feature Extraction Unit process is only applied to the files that are filtered by the Decision Unit that fall in the gray area (e.g., where the decision unit cannot confidently indicate the file as clean or encrypted). In addition to the simple ML features, additional features are determined, and end-to-end spatial entropy analyses performed (i.e., entropy measurements at a finer granularity of the file). This leads to a high-resolution dataset per file that can be analyzed by the complex ML model to address the most complicated ransomware signatures and corner cases. Once the feature extraction for a given file is complete, a unique token is generated to anonymize the file for data privacy, and the feature metadata together with the token identifier are uploaded to the cloud via REST API for additional analysis. In differentiating between the simple and complex ML models, the simple ML model can use less features and identify files that have been attacked by more prevalent ransomware applications. The simple ML model is used to identify a large subset of ransomware attacks without the use of the complex ML model. The complex ML model uses additional or supplemental features of the file to identify ransomware attacks that cannot be classified by the simple model. The more complex features can include user information, increased measures of randomness or entropy for the file (e.g., measures of randomness across smaller chunks of the file), or some other additional feature from the file.

Cloud System

The Cloud System includes a Complex ML Model Inference Engine that can be enhanced with additional signals or features from the simple ML model. The Complex ML Model Inference Engine uses a complex ML model that leverages state-of-the-art ML techniques and demands heavy compute resources that are readily available in the Cloud (e.g., processor and memory resources). It uses the feature data extracted from the On-Device System for the files that fall in the gray area and predicts whether a file was attacked by ransomware using a more complex model that analyzes additional features than the simple model. In other words, given the metadata of a file that failed to be accurately detected by the simple model on the device, the inference engine in the cloud will leverage the extensive features to decide whether the file is clean or maliciously encrypted. Once the decision is made in the cloud, the verdict and the unique token will be sent back to the device to take the appropriate action. Given that the complex model runs on the cloud, it can also pull in other signals from different resources if available such as User Entity Behavior Analytics (UEBA) as well as other Security Information and Event Management Systems (SIEMs) to augment the signal from the box to generate a better prediction. One of the key advantages of the cloud system is the ability to do frequent updates to the ML algorithm as compared to the model on the box, which is tied to the release cycle of the local storage software.

Training Data

The models that are deployed to detect malicious activity are trained on datasets derived from a public corpus of files, private datasets, and/or synthetically created datasets. The datasets include unencrypted versions of the files, partially encrypted versions, and fully encrypted versions. The models thus learn to detect the presence of malicious encryption from the entropy signals derived from the files. In some implementations, the datasets include a subset of files that are generated using simulated approaches of running a controlled encryption program that generates encrypted files like real ransomware strains. The controlled encryption program can model any ransomware strain at the file level (e.g., execute a form of ransomware to generate the encrypted files).

In one implementation, a developer system for ransomware detection identifies features associated with a training set that includes files that are unencrypted, partially encrypted, and fully encrypted, wherein each of the files includes a label indicative of whether the file is representative of a safe file or a file attached by ransomware. The features include measures of randomness for the set of files, header information for the set of files, file extension information for the set of files, or some other information for the set of files. The developer system further determines relationships between the features and whether a file of the training data set was labeled as attacked and generates a machine learning model that outputs a determination of whether a new file has been attacked based on the relationships.

Although demonstrated in the previous examples using files, similar operations can also be performed in object storage where an object in object storage is analyzed to identify whether the object has been attacked by ransomware. Object storage is a type of data storage architecture that manages data as objects, as opposed to the traditional file system hierarchy or block storage used in many storage area networks (SANs) and file servers. In object storage, data is bundled with its metadata and a unique identifier to form an object. These objects are stored in a flat address space, and each object can be accessed individually through a unique identifier.

File Chunking

In some implementations, when applying either the first or second level of ransomware detection, the file is chunked or divided into portions that provide context on the entropy across different portions of the file. For example, when a file is selected for ransomware detection, the file is divided into eight kilobyte chunks by a computing device (i.e., the data storage computing system). Once divided, entropy or another measure of randomness is calculated for the chunks, and the machine learning model is applied using the entropy values. After applying the machine learning model, the computing device determines whether the output of the machine learning model indicates that the file was attacked, is safe, or cannot be determined. When the computing device cannot determine whether the file was attacked, the computing device divides the file into second chunks of a second chunk size that provide a finer granularity than the first chunk size (e.g., four kilobyte chunks). Once chunked, entropy values are calculated in association with each of the chunks and the machine learning model is applied for a second time to determine whether the file has been attacked. In some implementations, the decreased chunk size is repeated until a determination is made that the file was attacked or safe, or until a threshold chunk size is reached. In some examples, a first set of chunk sizes are available to be processed at the data storage computing system (i.e., first level of ransomware detection), while a second chunk size (finer granularity) is processed at the cloud system (i.e., second level of ransomware detection).

In some examples, a file selected for ransomware detection exceeds a threshold size. Accordingly, rather than chunking the entire file, portions of the file are randomly selected to be chunked and entropy calculated for the random chunks. The selected portions will include at least header information for the file that can be used as features that are applied to the machine learning model.

Technical Effect

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of ransomware detection that allows for improved detection of malicious activity; 2) non-routine and unconventional operations for offloading more complex ransomware detection to the cloud, thereby taking advantage of the fast-updated cycle of cloud software relative to on-premises software; and 3) the efficient use of network resources by detecting most instances of ransomware locally, thereby avoiding the need to transmit data over network connections to the cloud.

In addition, the innovation provides a multi-layered ransomware detection approach (based on Machine Learning algorithms) that optimally leverages compute on the device as well as the cloud. Current solutions provide ransomware detection either on the box/primary location or secondary (backup) location. The proposed approach bridges the gap allowing for the optimal use of compute resources on local boxes by deploying a light-weight model to make instant decisions on the box (filtering out large portion of the files due to confident detections) while leveraging cloud computing power for files that fall outside the detection confidence of the on-box algorithm. For the less confident detections by the box, the metadata (essentially a feature vector) of these files are sent to the Cloud to be processed further by the complex ML algorithm.

General Overview

Described herein are systems and methods for providing compute optimized multi-level ransomware detection via file processing. In an organization, a data storage computing system is deployed that provides data management, data storage, and data protection services in association with a datastore. The data storage computing system is local or private to the organization and enables these services through features that support various storage protocols, data tiering, deduplication, encryption, high availability, amongst other potential features.

Here, to support the identification of ransomware active in association with the datastore, the data storage computing system identifies a relevant file, such as a file with a recent write request to the data store and identifies features in association with the file. The features include a measure of entropy (or other measure of randomness) of the file and a sign of encryption by ransomware, header information for the file, file extension information for the file, or some other feature of the file. In some implementations, the measure of entropy can be defined as follows $H=-\Sigma_{\{i=1\}}^{\{n\}} P(x\_i) *\log 2(P(x\_i))$. Where H is the entropy of the file, n is the number of distinct symbols in the file, and $P(x\_i)$ is the probability of occurrence of the ith symbol in the file. In simpler terms, the formula involves calculating the probability of each unique symbol in the file, multiplying it by the logarithm (base 2) of that probability, and then summing up these values for all distinct symbols. The negative sign ensures that the result is non-negative. To apply this formula, the file is analyzed to determine the probability distribution of symbols. The more uniform the distribution (i.e., the closer the probabilities are to each other), the higher the entropy, indicating greater randomness or unpredictability in the data.

The data storage computing system attempts to determine, from the features, whether the features indicate that the file is affected by ransomware or unaffected by ransomware. When a determination can be made locally at the data storage computing system, the computing system implements an action based on the determination (e.g., take a snapshot (copy) of the data, notify the administrator, etc.). When a determination cannot be made locally at data storage computing system, such as when the features could not adequately define whether the file was affected, the data storage computing system communicates a request to a cloud service to determine whether the file is affected or unaffected by ransomware software.

In at least one implementation, the data storage computing system determines a confidence score for the file based on the features, wherein each feature can contribute to the score. Once the score is determined, the data storage computing system compares the confidence score to criteria for classifying the file as affected or unaffected by ransomware. If the file can be classified, then an action is taken on the file without consulting with an external cloud service. Otherwise, the external cloud service is enlisted to further analyze the file based on second features. Examples of second features include additional entropy or randomness values associated with chunks of the file, file extensions, file header information, as well as secondary features known or ascertained by the cloud service. The cloud service then performs additional processing on the second features to determine whether the file is affected by ransomware and communicates a threat determination back to the data storage computing system.

Examples of second features include aspects of a file that the cloud service may know about the file that are unknown (or not easily obtainable) on-premises device such as user history with respect to the file, file history, and the like. For instance, the cloud may have information about when the file was last opened, who opened it, usage history and patterns for the file. Such additional information may be factored into the second-level risk assessment. The cloud service provides expandable compute resources available for allocation to support the ransomware assessment. Advantageously, while most file assessments are made at the data storage computing system, the cloud service resources are used for difficult file assessments that require additional compute resources, such as processing or memory resources that would otherwise be unavailable at the data storage computing system.

In an example, if a local machine learning model classified as file as "clean" but with low confidence, then the second features (or more complex features) may be uploaded to the cloud to be processed along with additional features such as access patterns gleaned from file system data. For instance, if the file was recently opened by a known insider threat actor from other signal source, that fact will influence the cloud-based machine learning model to label the file as "corrupt" and to take corrective action. However, if the cloud-based model determines that the access patterns are generally normal, then the "clean" determination may be confirmed.

It may be appreciated that the steps of classifying a file as clean (or corrupt) and determining a confidence score for the classification may be implemented as two discrete steps. That is, a machine learning model may be trained to output a binary classification for a file as either clean or corrupt, while also outputting a confidence score for the classification. In an example, the model may classify a file as clean and indicate that it is very confident in its classification. The confidence level may be output as a score from a range of scores. For instance, the confidence score may range from 0 to 1, with 0 indicating the lowest possible level of confidence and one the highest. In such an implementation, the confidence score for clean classifications would drive the determination of whether a second level of ransomware analysis is needed for a given file.

Alternatively, whether a file is clean (or corrupt) and the level of confidence for the classification may be integrated into a single value (or score) output by the machine learning model. In such an implementation, an additional layer of logic analyzes the score to determine where it falls in the range and, from there, whether a second level of analysis is needed. For example, a machine learning model may output a range of scores indicative of whether a file is clean or corrupt. In a simple example, a machine learning model may output a score between 0 and 1 that represents how corrupt a file is. Thus, a score of zero would indicate that a file lacks any indication of being corrupt (a/k/a clean), while a score of 1 would indicate that the features of a file indicate that the file is corrupt. Logic applied to the score interprets the score based on rules that determine how to treat the file based on where its score falls in a range. For instance, any scores above 0.5 may be considered indicative of malicious activity, thereby triggering mitigative action. Scores below 0.2 may be considered safe. However, scores between 0.2 and 0.5 may be ambiguous—e.g., safe, but not with enough confidence or certainty-thereby triggering a second level of analysis in the cloud. The specific ranges may be adjusted based on feedback, heuristics, or on some other basis as circumstances dictate or allow.

FIG. 1 illustrates a computing environment 100 to provide compute-optimized multi-level ransomware detection using file processing according to an implementation. Computing environment 100 comprises data storage computing system 110 and cloud computing system 105. Data storage computing system 110 comprises data store 180, file 120, feature identification 130, inference engine 132, confidence operation 134, second feature identification 136, and action service 138. Cloud computing system 105 comprises user information 152 and interface engine 150. Although demonstrated as remote from one another, data storage computing system 110 and cloud computing system 105 can be implemented as two different computing systems that comprise on-premises computing systems and/or cloud computing systems. For example, data storage computing system 110 can represent a first cloud computing system of one or more devices, while cloud computing system 105 can represent a second cloud computing system representing one or more second devices.

Data storage computing system 110 is representative of a computing device or devices of an organization that provides data management, data storage, and data protection services in association with datastore 180. In some examples, data storage computing system 110 enables these services through features that support various storage protocols, data tiering, deduplication, encryption, high availability, amongst other potential features. Here, to support datastore 180, various services are included as part of data storage computing system 110 that monitor file writes to datastore 180 and determine whether the file is compromised via a ransomware attack.

In the example of FIG. 1, when a write is created in association with file 120, feature identification 130 identifies features (or feature vector) associated with the file to determine whether the features correspond to a potential ransomware attack. The features comprise entropy values associated with the file, header information associated with the file, extensions of the file, or some other feature associated with the structure of file 120. Entropy refers to the measure of randomness in the data of file 120 and can be quantified via an equation that measures the randomness of the data. In some examples, entropy defined on a range, such as 0 to 1, where a value of 0 would be considered the least random and a value of 1 would be considered most random. In some examples, feature identification 130 identifies the entropy of file 120 at the file level. In other examples, feature identification 130 may identifies entropy at a chunk level or portion of the file, wherein different chunks can provide a different entropy value. The size of the chunks can be indicated by an administrator of data storage computing system 110, can be determined based on security preferences for data storage computing system 110, can be determined based on the current load on the on-premises device, or can be defined in some other manner. In some implementations, the entropy is measured in association with the edited portion of the file. For example, when 20 percent of a file is modified, the measurement of entropy applies to the 20 percent (or chunks of the 20 percent). Although demonstrated using entropy, other measures of randomness are identified in association with file 120 in some examples. The other measures of randomness include a standard deviation of the values in the file, or some other measure of randomness associated with the data in the file.

Once the features are identified in association with file 120, inference engine 132 determines a confidence score associated with the maliciousness or potential attack on file 120. In some examples, inference engine 132 defines the score based on a combination of the various factors identified by feature identification 130. The confidence score can comprise a numerical value, a grade, or some other indication or value that indicates the likelihood file 120 corresponds to a ransomware affected file. For example, inference engine 132 generates a first score that indicates a higher likelihood of ransomware when the file indicates larger entropy values and comprises a file extension that is linked to previously identified ransomware. In contrast, inference engine 132 generates a second score that indicates a lower likelihood of ransomware when the file indicates lower entropy values. In at least one implementation, the confidence score is defined on a scale of 0 to 1, although other scales or grades can potentially define the confidence score.

Once the confidence score is determined, data storage computing system 110 performs confidence operation 134 that compares the confidence score to criteria or threshold values. A first threshold indicates that the file is likely affected by ransomware, while a second threshold indicates that the file is most likely not affected by ransomware or is safe. Returning to the example of the confidence score from 0 to 1, a score of 0.9 or higher can represent a file that is likely affected by ransomware, while a score of 0.1 or lower can represent a file that is likely not affected by ransomware. When a confidence score is above 0.9 or below 0.1, data storage computing system 110 performs action service 138 to take an action on file 120. When the file does not indicate that it is affected by ransomware, action service 138 implements an action that permits the file 120 to be stored in data store 180. Action service 138 can further remove any unnecessary snapshots or other data that was stored in the event file 120 indicated the presence of ransomware. In an alternative example, when file 120 is likely affected by ransomware, action service 138 initiates operations to preserve the data in datastore 180 and/or file 120. The operations can include maintaining a snapshot of datastore 180, alerting an administrator of the environment, or providing some other action to remediate the ransomware threat.

In the example where confidence operation 134 determines that the confidence score does not satisfy the criteria to implement an action using only the inference operations at data storage computing system 110, data storage computing system 110 performs second feature identification 136. The second features comprise additional or different features than those identified in feature identification 130. The second features (or second feature vector) can comprise measures of randomness associated with a different chunk size of the file (i.e., finer granularity), bit patterns within the file, or some other information. In some examples, second feature identification 136 supplements the first features with additional features that are supplied to cloud computing system 105.

Cloud computing system 105 is a technology infrastructure that enables users and organizations to access a range of computing resources and services over the internet. Cloud computing system 105 comprises physical computers that are used to abstract and centralize the management of hardware, software, and data, permitting for scalability and flexibility for the users and organizations. Here, while data storage computing system 110 provides a first inference engine for the file, data storage computing system 110 possesses limited resources to determine whether a file is affected by ransomware. The limited resources comprise processing resources, memory resources, and the like that are not encountered in cloud computing system 105. Accordingly, computing environment 100 is configured such that inference engine 132 can identify a portion (i.e., a majority) of the ransomware affected files and can rely on inference engine 150 to identify remaining ransomware affected files that require additional factors and processing.

Once the second feature identification 136 is performed, cloud computing system 105 performs inference engine 150 which compares the provided features to attributes of previously identified instances of ransomware affected files. When the features indicate possible modification via ransomware, inference engine 150 and cloud computing system 105 provide an indication to data storage computing system 110 indicating the threat determination. Action service 138 uses the information to take an action in association with the file. The action can comprise rolling back the file to a previous version, placing data storage computing system 110 in a quarantine setting to limit the spread of the ransomware, generate a notification for an administrator, or provide some other action in association with the threat. In an example where inference engine 150 determines that the file does not correspond a threat based on the features in relation to learned attributes for ransomware, inference engine 150 provides a threat determination to action service 138 indicating the file is not affected by ransomware. The notification permits actions service 138 to store the file or provide some other storage action in association with the file.

In some implementations, in addition to implementing inference engine 150 based on the provided features and the machine learning from known affected files, inference engine 150 further applies user information 152 to determine whether the file is potentially affected by ransomware. User information 152 comprises information about typical user changes to a file, types of changes to a file, the type of data accessible to the user, or some other information associated with the user modifying file 120. User information 152 could be considered part of the second features provided for the file in some examples. Thus, when a change is made to a file that is not typically provided by a user, cloud computing system 105 determines that the change is abnormal and indicates that the file could be affected by a ransomware threat as part of the threat determination.

In some implementations, inference engine 150 is unable to determine conclusively whether file 120 was potentially affected by ransomware. When this occurs, cloud computing system 105 replies with a conservative threat determination that permits action service 138 to act as if file 120 might be affected. Action service 138 can generate a notification for a user, can provide a threat assessment for potential executables on the computing system 110, can quarantine data storage computing system 110, or can provide some other action in association with mitigating the potential ransomware threat.

In some examples, the feature identification operations and inference engines are configured based on a dataset of files comprising files affected by ransomware and files unaffected by ransomware. The files comprise unencrypted files, partially encrypted files, and fully encrypted files. In configuring the feature identification operations and inference engines, a development computing system or machine learning computing system operates by training models on vast datasets (i.e., the encrypted, partially encrypted, and unencrypted files described above), where algorithms analyze the data, identify patterns, and establish relationships between variables. These models can then be used to make predictions or classifications when presented with new, unseen data. The learning process typically involves adjusting model parameters iteratively to minimize the difference between predicted and actual outcomes, ultimately improving the model's accuracy and ability to generalize to new examples and situations. Here, the dataset of files is used to identify features that typically correspond to ransomware attacks, wherein the features comprise encryption features, measures of randomness, file extension similarities, bit patterns, and the like. Once developed, the feature identification operations and inference engines are deployed at the local data storage computing systems of the organizations and the cloud computing system that can provide additional resources for processing the features of difficult files. In some implementations, feature identification 130 and inference engine 132 will process a file using only a subset of the features that are available at cloud computing system 105. This permits cloud computing system 105 to only be used on files that cannot be otherwise processed by data storage computing system 110. For example, feature identification 130 and inference engine 132 may be programmed with feature identification that permits the processing of 95 percent of all files, while feature processing for the remaining five percent of files are offloaded to cloud computing system 105.

In some implementations, data storage computing system 110 will process the portions of file 120 that were modified or written to as part of the modification. For example, if 20 percent of the file is modified by a user, the features will be identified in association with that 20 percent. The features include measures of randomness associated with chunks of the modified portion, file extension information (if changed), header information (if changed), or some other information associated with the file. Advantageously, rather than processing the entire file, data storage computing system 110 and, if necessary, cloud computing system 105 only processed the modified portions of file 120.

Figure 2:
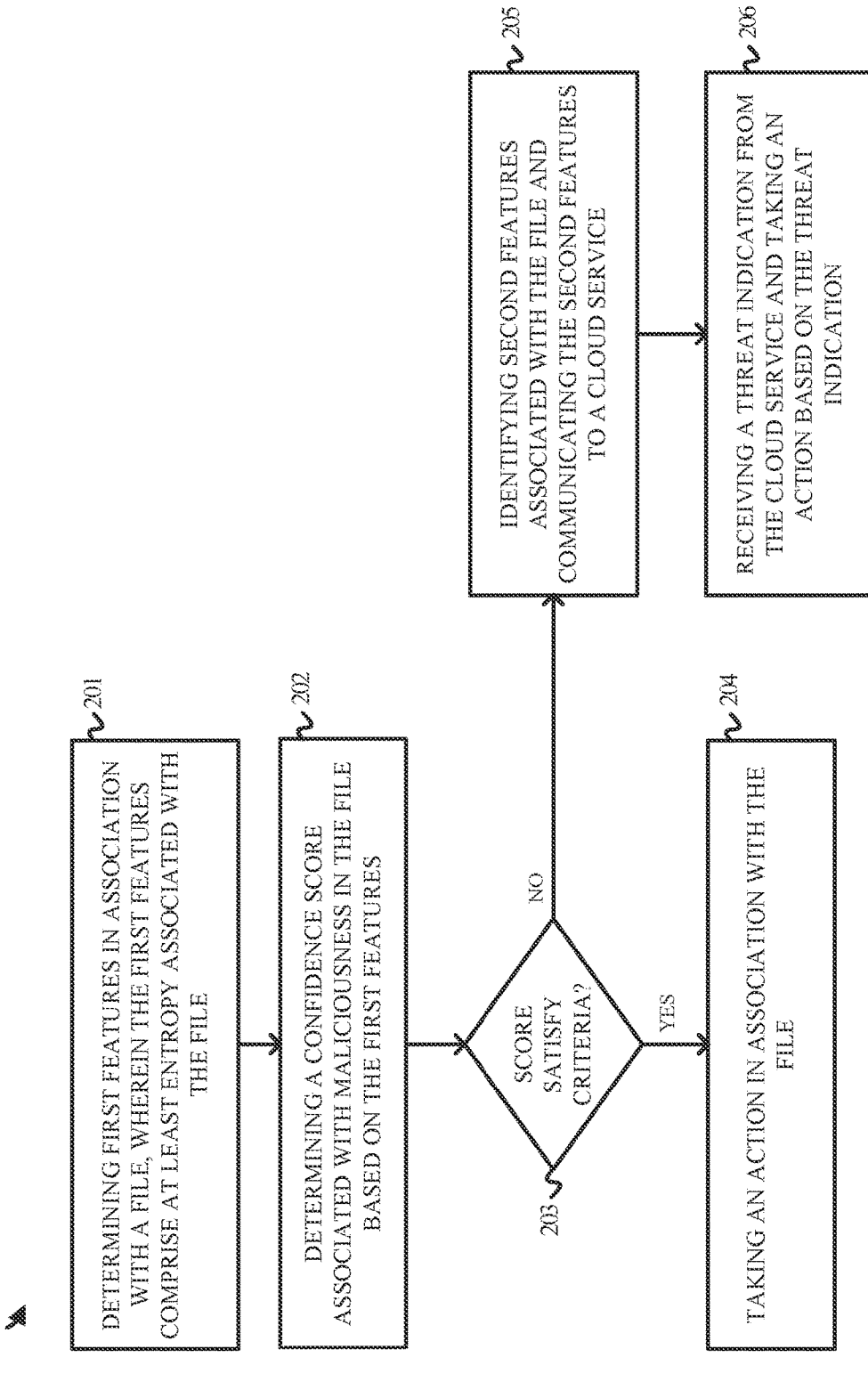
FIG. 2 illustrates a method of operating a computing device to provide compute optimized multi-level ransomware detection using file processing according to an implementation.

FIG. 2 illustrates a method 200 of operating a computing device to provide compute optimized multi-level ransomware detection using file processing according to an implementation. The steps of operation 200 are referenced parenthetically in the paragraphs that follow with reference to systems and elements of computing environment 100 of FIG. 1. Specifically, method 200 can be performed by a computing device represented by data storage computing system 110, wherein data storage computing system 110 can comprise a server computer or some other managing computing device.

Method 200 includes determining (201) first features in association with a file, wherein the first features comprise at least entropy information (or some other measure of randomness) associated with the file. The first features may further comprise header information associated with the file, file extension information associated with the file, or some other metadata associated with the file. In some implementations, the file is identified when a write is generated for the file indicating that the file has been modified by a user associated with data storage computing system 110. The write triggers the computing device to initiate steps of operation 200. In some implementations, the features are identified in association with only modified portions of the file and not the entirety of the file.

Once the features are identified or extracted from the file, method 200 further comprises determining (202) a confidence score associated with maliciousness in the file based on the first features. The confidence score comprises a score generated from the various features determined in step 201, wherein different features of the file may represent a larger factor in the score. The score is generated at least in part from a machine learning model provided to data storage computing system 110 and employed as part of inference engine 132. For example, entropy associated with the file may represent a larger factor than the file type extension identified for the file. In some examples, the confidence score falls within a range of values, wherein one end of the range represents a stronger likelihood that the file is affected by ransomware, while the other end of the range represents a stronger likelihood that the file is unaffected by ransomware. Thus, a file with low entropy will be associated with a first score that indicates a lesser likelihood of a ransomware threat to the file, while a file with higher entropy will be associated with a second score that indicates a higher likelihood of a ransomware threat.

After the confidence score is determined for the file, method 200 further determines (203) whether the score satisfies criteria to initiate an action at the computing device without requesting further processing from the cloud computing system. The criteria comprise thresholds for indicating that the file is not affected and thresholds for indicating that the file is infected. For example, the confidence score comprises a value between zero and one, wherein a value closer to one is more indicative of a potential ransomware affected file. The threshold for an affected file can be set to above 0.9 for an affected file and below 0.1 for an unaffected file. If the confidence value satisfies either criterion (below 0.1 or above 0.9), method 200 comprises taking (204) an action in association with the file. The action comprises storing the file in the database when the file is not affected, notifying an administrator when the file is affected, placing the computing device in a quarantine state (e.g., offline, or not connected to the network), limiting execution of applications, or providing some other action based on whether the file is determined to be affected or unaffected.

When the confidence score does not satisfy the criteria, method 200 further comprises identifying (205) second features associate with the file and communicating the second features to the cloud service. In some implementations, the second features are used to supplement the first features that were identified by the computing device. In other implementations, the second features can comprise replacement features in association with the file. The second features can comprise entropy values associated with chunks of the file, header information, bit patterns in the file, or some other information that is provided to the cloud service. In some implementations, the computing device further provides a portion of the first features as part of the second features. Once received, the cloud service processes, via a second machine learning model different from the machine learning model at data storage computing system 110, the received features to provide a threat determination or indication to the computing device. In some examples, the features that are provided to the cloud service comprise entropy values at a finer granularity than the entropy values determined at the computing device. For example, the entropy values at the computing device can comprise a first chunk size, while the second entropy values provided to the cloud service comprise a second chunk size (e.g., eight kilobytes and four kilobytes). In some implementations, the cloud service comprises more compute resources, such as memory and processing resources, than the computing device, permitting the cloud service to assess additional features of the file to determine whether the file is affected by ransomware. Once a determination is made regarding the file, the cloud service returns a threat determination or indication to the computing device. Method 200 further includes receiving (206) the threat indication from the cloud service and taking an action basted on the threat indication. The actions comprise notifying an administrator of a threat if one is identified to the file, preventing the storage of the file if a threat is identified, storing the file in the datastore if a threat is not identified, or providing some other action in association with the file.

Figure 3:
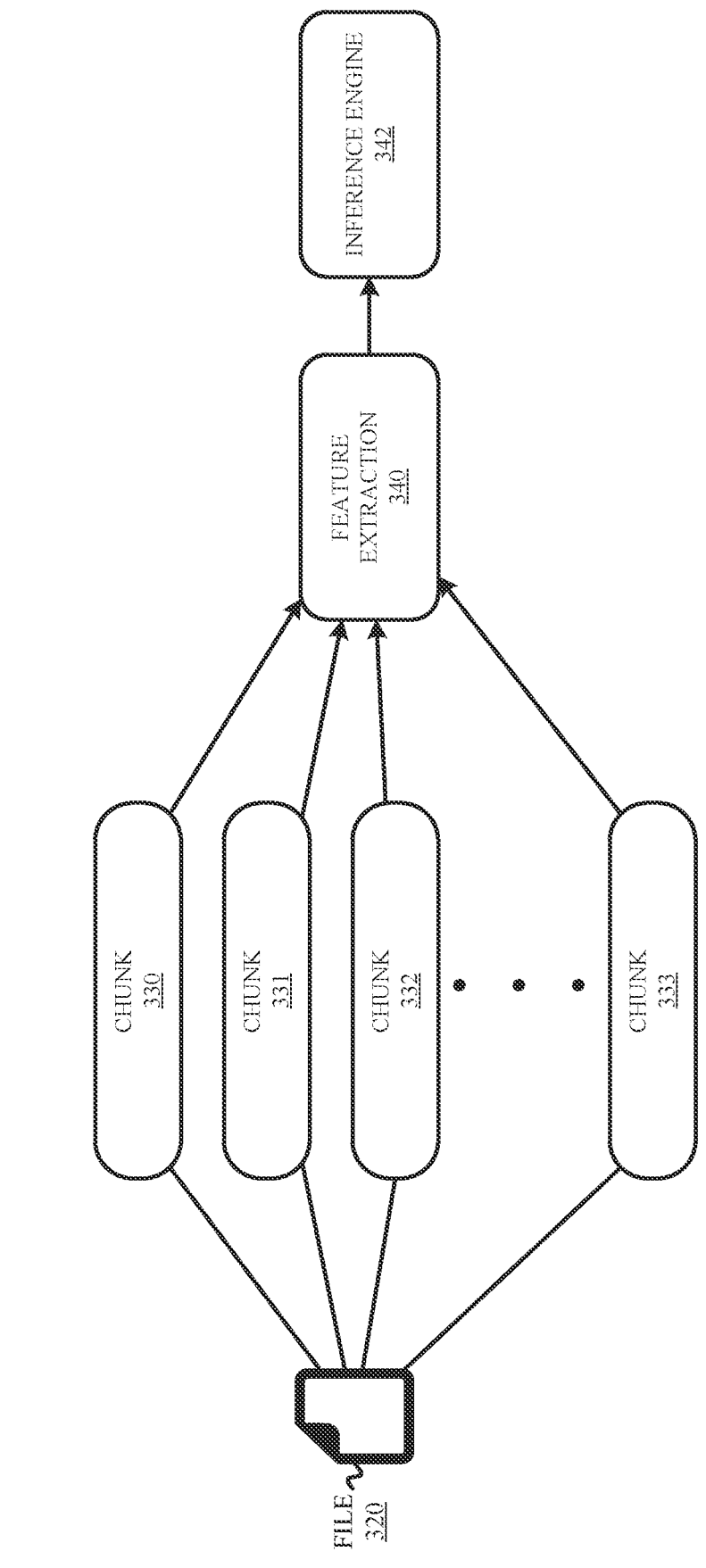
FIG. 3 illustrates an operational scenario of chunking a file to identify ransomware features according to an implementation.

FIG. 3 illustrates an operational scenario 300 of chunking a file to identify ransomware features according to an implementation. Operational scenario 300 includes file 320, chunks 330-333, feature extraction 340, and inference engine 342. Feature extraction 340 can be performed a local data storage computing system, such as data storage computing system 110 of FIG. 1. Inference engine 342 can be performed either at the local data storage computing system or at a cloud service dependent on whether the cloud service is required for determining whether the file is affected by ransomware.

In operational scenario 300, a data storage computing system identifies a file 320 to determine whether the file is affected by ransomware. The file can be selected based on a write initiated for the file, at random, or based on some other means. By selecting the file when a write is initiated, the data storage computing system can quickly identify whether a ransomware attack is initiated by identifying the file as soon as it is saved in the datastore. Additionally, by selecting files at random, the data storage computing system can identify files attacked by ransomware that may not have been identified at the time of storage.

Once the file is selected, the file, or modified portions of the file, is broken into chunks 330-333 that are representative of data portions of the file (e.g., 4 KB). The chunks (e.g., division of the file) may have a uniform size or may be heterogenous. Once broken into chunks, the computing system performs feature extraction 340 that identifies header information, bit patterns, or determines entropy associated with each of the chunks. Entropy for each of the chunks can be used to identify which portions of the file have been encrypted if any and can provide more details regarding the location of encryption within a file. After the features are extracted, inference engine 342 ingests the features and determines whether the file is potentially affected by ransomware.

In some implementations, a first inference engine at the local data storage system uses a first granularity or chunk size to process the file and infer whether any ransomware is applied. However, if the first inference engine cannot resolve or is uncertain about the file, a second inference engine at the cloud service uses a second granularity or smaller chunk size to process the file and infer whether ransomware has attacked the file. The second inference engine can use further features or metadata from the file (e.g., bit patterns) that are not considered by the first inference engine. In some implementations, the first inference engine is configured to process a first set of features to identify a threshold percentage of ransomware attacks (e.g., 90 percent), limiting the amount of processing implemented on the local data storage computing system. Advantageously, further processing and features are accomplished using the flexible cloud computing system 105 that can provide analysis of the additional features from the file without reading the data from the file itself.

Figure 4:
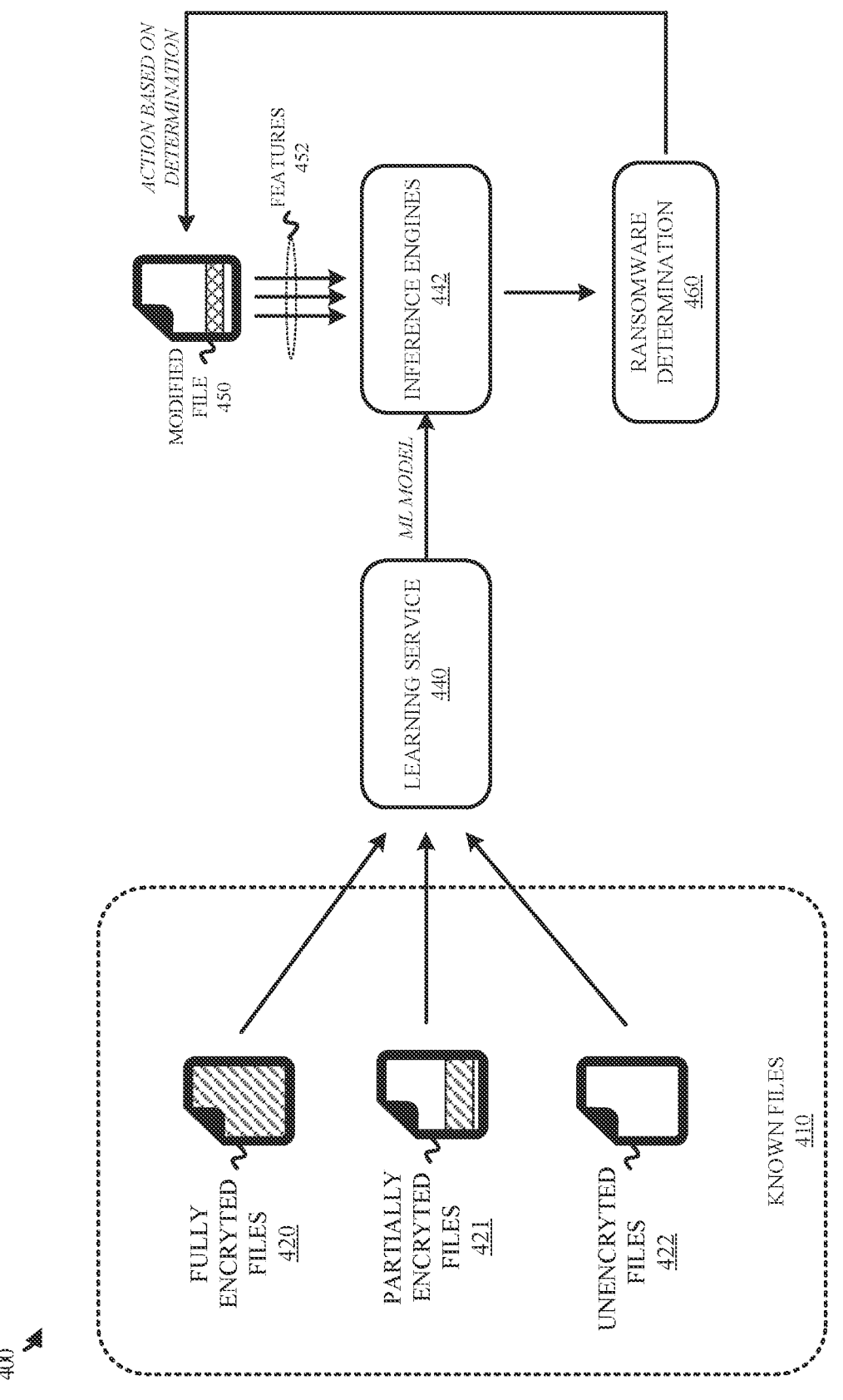
FIG. 4 illustrates an operational scenario of providing a dataset to a machine learning environment to identify ransomware features according to an implementation.

FIG. 4 illustrates an operational scenario 400 of providing a dataset to a machine learning environment to identify ransomware features according to an implementation. Operational scenario 400 includes known files 410, learning service 440, inference engines 442, modified file 450, features 452, and ransomware determination 460. Known files 410 comprises fully encrypted files 420, partially encrypted files 421, and unencrypted files 422. Known files 410 are representative of files that are known to be unchanged by ransomware software and files that are known to be changed by ransomware software. In some examples, at least a portion of fully encrypted files 420 and partially encrypted files 421 are generated using known ransomware (i.e., these files are synthetically generated to enhance the training data), wherein a safe file is encrypted using the known ransomware application and added to known files 410. The files that were not provided to the different ransomware applications or were not received from a database of known ransomware affected files are stored.

In operational scenario 400, a learning service that executes on one or more development computing devices performs learning service 440 (machine learning) on known files 410 to identify features or attributes of the files that indicate a file is affected by a ransomware attack. Machine learning relies on the analysis of data to identify patterns, make predictions, or perform tasks, such as identifying entropy characteristics or values associated with different types of ransomwares. Once learning service 440 is performed, malicious feature signatures (or relationships) are provided to inference engines 442 or machine learning models that are operated locally at a data storage computing system and a cloud computing service. The malicious feature signatures provided to the data storage computing system comprise features that can identify a portion of the ransomware attacks. Specifically, to limit the amount of processing at the data storage computing system, a limited quantity of features and processing are performed to identify a desired ratio of ransomware attacks (e.g., 90 percent). Thus, only the most frequently identifiable features are provided to the data storage computing system. In contrast, for files with features that cannot be determined to be affected or unaffected at the data storage computing system, the cloud service system can comprise on demand compute resources that can process additional features from the file to more accurately determine whether the file was affected by ransomware.

In some implementations, the cloud service is incapable of determining whether the file is associated with a ransomware attack. Specifically, while the cloud service provides enhanced compute resources for additional features associated with the file, the cloud service may be incapable of determining whether the file is affected. Accordingly, the cloud service may generate a notification that the file be elevated for visual examination for an administrator. Alternatively, the cloud service may request remediation operations, such as quarantining or stopping the storage of the file, limiting the execution of applications at the data storage computing system, or some other operation. In some examples, the cloud service provides a threat indication to the data storage computing system based on a score like the score described above provided by the data storage computing system 110 of FIG. 1.

After inference engines 442 are generated using learning service 440 and the malicious feature signatures. Modified file 450 is identified to be stored in a datastore for an organization. Modified file 450 is a file representative of a text document, database (i.e., spreadsheet), or some other file that is stored by a user associated with the organization. In response to identifying modified file 450, features are extracted from modified file 450 and inference engines 442 are applied using the extracted features to provide ransomware determination 460. The features from file 450 comprise measures of randomness identified for at least the modified portions of the file, file extension information for the file, header information for the file, or some other feature for the file.

In some implementations, a first inference engine is applied to the file as part of a first level of ransomware detection. If the first inference engine provides a value that conclusively determines that the file is safe or attacked, an action is taken based on the determination. The action can permit the file to be stored when the file is deemed safe, can cause the creation of a snapshot when the file is deemed attacked, can cause a notification to an administrator when the file is deemed attacked, or can provide some other action based on the determination. When the first inference engine is incapable of determining whether the file is attacked, a second inference engine is applied that uses additional or supplemental features of file 440. For example, while the first inference engine uses measures of randomness associated with a first chunks size of the file, the second inference engine uses measures of randomness associated with chunks of a second size. In some implementations, the first inference engine is deployed in an on-premises computing system for the organization and the second inference engine is deployed in one or more computing systems in a cloud computing environment. The cloud computing environment is provided with the features of the file and not the file itself to support the ransomware detection while maintaining security of the file. In other examples, the first and second inference engines are employed within the same environment. Once ransomware determination 460 is made (either using the first inference engine or the second inference engine when required), an action is deployed in association with the file based on whether the file is determined to be safe or attacked.

FIG. 5 illustrates a method 500 of operating a computing device to provide compute optimized multi-level ransomware detection using file processing according to an implementation. The steps of method 500 are referenced parenthetically in the paragraphs that follow.

Method 500 includes determining (501) first features in association with a file, wherein the first features comprise at least entropy associated with the file. In some implementations, the computing device identifies a single measure of entropy or other measure of randomness for the file (or the modified portions of the file). In other implementations, the computing device identifies the entropy or measures of randomness associated with different chunks of the file (or the modified portions of the file as part of the write). Other types of features for the first features include file extension information for the file, header information for the file, or some other feature associated with the file. Method 500 further includes determining (502) whether the file can be classified as safe or attacked in the on-premises environment of the computing device. In at least one example, the computing device applies a machine learning model that outputs a determination of whether the file has been attacked. The machine learning model indicates a confidence score of whether the file is safe or has been attacked. When the confidence score satisfies criteria or can be classified locally at the computing device, method 500 further includes taking (503) an action in association with the file without communicating with a cloud service or cloud environment. When the file is classified as safe based on the confidence score, the computing device permits the file to be stored and provides no further action. When the file is classified as having been attacked, the computing device takes remediation operations, such as stopping the file from being stored, generating a snapshot of the data store with the file, notifying an administrator, or some other remediation operation.

If it is determined that the file cannot be classified locally as safe or attacked, method 500 includes identifying (504) second features associated with the file and communicating the second features to a cloud service or cloud environment. The cloud environment represents a remote environment in a separate location from the computing device. The second features comprise measures of entropy or other randomness for the file, header information for the file, user access information for the file, or some other information in association with the file. In some implementations, the second features comprise at least a portion of the first features identified and processed using the machine learning model at the computing device.

After the second features are communicated to the cloud service, method 500 further includes receiving (505) a threat indication from the cloud service and taking an action based on the threat indication. In some implementations, the cloud service employs an inference engine or machine learning model on the features that are different from the machine learning model applied in the on-premises computing device. The machine learning process at the cloud service uses additional features or vectors associated with the file to more accurately determine whether the file is safe or attacked by a ransomware application. The machine learning model at the cloud service uses a set of rules and mathematical computations that enable a computer system to learn patterns from data and make predictions or decisions without being explicitly programmed. It uses statistical techniques to analyze and generalize from input data, adapting its behavior based on the information it receives. Here, the information comprises the features associated with the file, including the entropy or randomness of the file (or chunks of the file), extension information for the file, user information for the file, file name information for the file, or some other determination for the file. From the machine learning operations, the cloud service provides an indication of whether the file is safe or affected by a ransomware application. In some implementations, the machine learning generates a score. If the score satisfies criteria, the cloud service provides an indication that the file was potentially attacked by ransomware. If the score does satisfy the criteria, the cloud service provides an indication that the file is safe. Based on the indication provided to the on-premises computing device, the computing device can permit the file to be stored in the data store (when safe) or can perform a mitigation operation when the indication provides the file is potentially attacked by ransomware. The mitigation operation comprises generating a snapshot of the file and/or the data store, generating a notification for an administrator, or providing some other mitigation operation for the potential ransomware in association with the data store. The notification to the administrator can indicate the affected file, the user associated with the affected file, feature information for the file (e.g., measures of randomness), or some other information. The notification can be provided via email, application notification, or via some other means.

Figure 6:
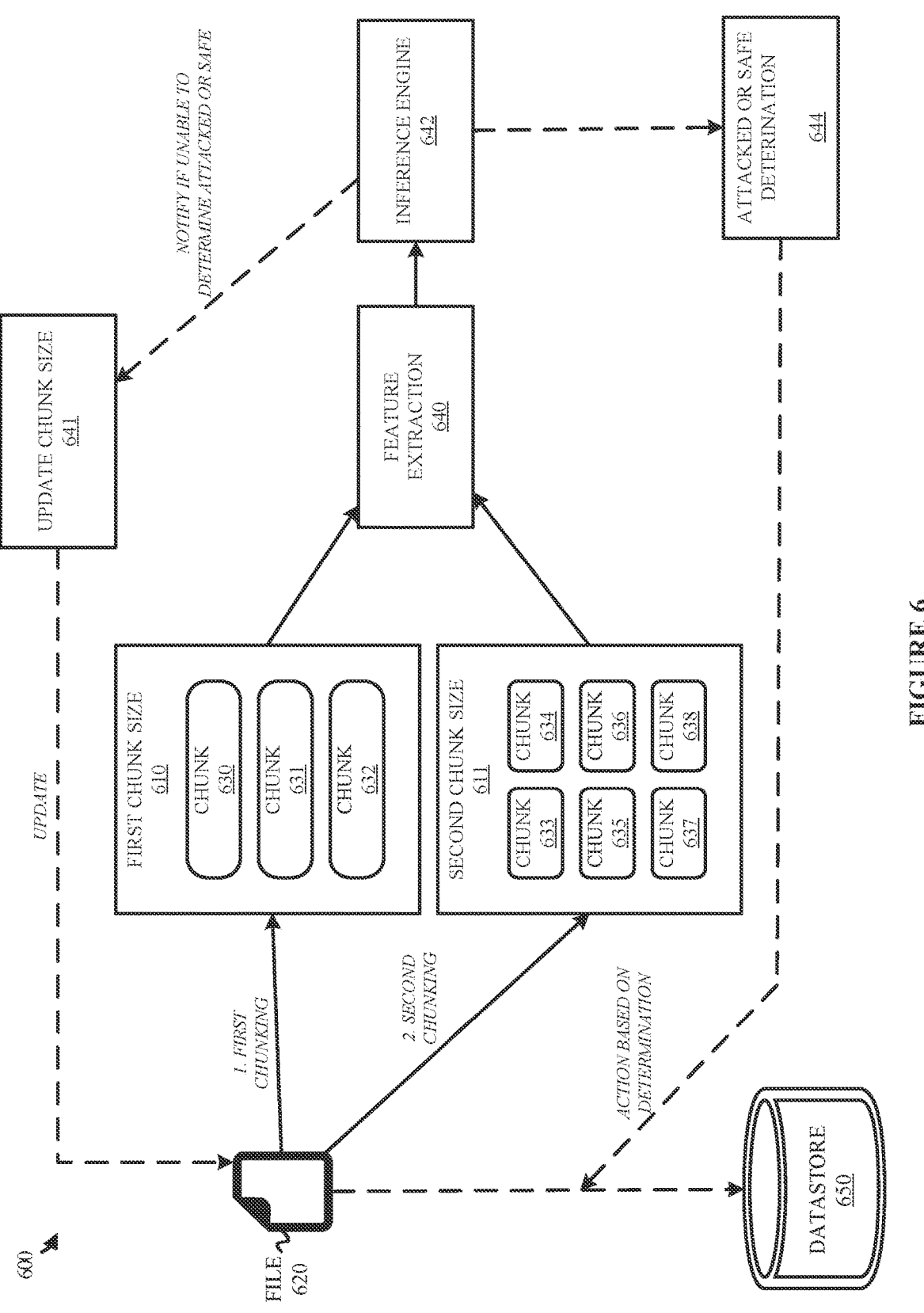
FIG. 6 illustrates an operational scenario of modifying chunk sizes for a file to identify ransomware in the file according to an implementation.

FIG. 6 illustrates an operational scenario 600 of modifying chunk sizes for a file to identify ransomware in the file according to an implementation. Operational scenario 600 includes file 620, chunk sizes 610-611, chunks 630-638, feature extraction 640, update chunk size 641, inference engine 642, and attacked or safe determination 644. Feature extraction 640, update chunk size 641, and inference engine 642 are examples of operations deployed by a computing device at an on-premises environment. The on-premises environment comprises hardware, servers, and other resources to manage a data store locally and privately for an organization.

In operational scenario 600, a computer device identifies file 620 that corresponds to a file recently written in association with a data store. In response to identifying the file, the computing device separates file 620 (or the modified portion of file 620) into chunks 630-632 of first chunk size 610. First chunk size 610 represents a default chunk size that is the largest chunk size available for file 620. For example, the chunk size may represent an eight-kilobyte chunks of file 620. As the file is chunked, feature extraction 640 extracts the various features from chunks 630-632. The features can be extracted and processed in sequence or in parallel by inference engine 642. The features include randomness information associated with the file (e.g., entropy, standard deviation measurements, or some other randomness determination), the file extension associated with the file, the file name associated with the file, or some other feature associated with the file. For example, feature extraction 640 determines entropy associated with each chunk of chunks 630-632, wherein entropy is a measure of its information content or randomness. Inference engine 642 leverages a machine learning model that is a computational algorithm or statistical model that learns patterns from data, allowing it to make predictions or decisions without being explicitly programmed. It leverages training data to optimize its parameters and generalize patterns for making accurate predictions on new, unseen data. Here, inference engine 642 uses the features extracted from chunks 630-632 and file 620 to determine a confidence that the file has been attacked by ransomware. The confidence score is compared to criteria to determine whether attacked or safe determination 644 can be made. If the score satisfies criteria to make attacked or safe determination 644, the computing device implements an action based on the determination. The action can permit the storage of file 620 when the file is safe or can take a remediation action when the file is attacked.

In some implementations, inference engine 642 cannot definitively classify file 620 as safe or attacked by ransomware using the features from first chunk size 610. For example, while a first portion of the chunks indicate high randomness, a second portion of the chunks may indicate a lower randomness. Consequently, the confidence score for file 620 may not satisfy criteria for file to be classified as attacked or safe. To identify where the more random data is in file 620, inference engine 642 generates a notification to update chunk size 641. Update chunk size 641 identifies a new chunk size for dividing file 620. For example, first chunk size 610 represents eight-kilobyte chunks of the file while second chunk size 611 and chunks 633-638 represent four-kilobyte chunks of the file. The reduced sizes of the chunks provide finer granularity that can be applied to a machine learning model to identify similarities between file 620 and previously identified ransomware affected files. Once chunks 633-638 are identified, feature extraction 640 is performed to identify features associated with chunks 633-638. The features include measures of randomness associated with each chunk of chunks 633-638, and can further include file extension information, header information for the file, or some other information from the file. In some implementations, at least a portion of the features are extracted prior to chunking the data of file 620. After the second feature extraction by feature extraction 640, inference engine 642 applies a machine learning model to determine whether file 620 has been attacked. Although demonstrated using two different chunk sizes, additional chunk sizes can be employed and applied to the machine learning model.

In some implementations, both chunks 630-632 of first chunk size 610 and chunks 633-638 of second chunk size 611 are processed locally at the on-premises device. For example, the on-premises device implements machine learning model of inference engine 642 on the features associated with chunks 630-632. Once the result of inference engine 642 is inconclusive to indicate that the file is attacked or safe, update chunk size 641 generates chunks 633-638 that represent smaller portions of data in file 620. Feature extraction 640 is performed to identify second features and the machine learning model of inference engine 642 is applied for a second time. In other implementations, different machine learning models are deployed based on the chunk size. For example, inference engine 642 applies a first machine learning model on chunks 630-632 and determines that a second machine learning model is required. Update chunk size 641 identifies chunks 633-638, feature extraction 640 extracts the features associated with chunks 633-638, and the features are provided to a second machine learning model. In some embodiments, the second machine learning model is also at the on-premises location, however, the second machine learning model can be in a cloud service remote from the on-premises location.

In some implementations, the only portions that are chunked for feature extraction from file 620 are the portions that were modified from a previous state of the file. For example, if 20 percent of a file is modified, then the modified 20 percent of the file is chunked for feature extraction. Advantageously, rather than processing the entire file, only the modified portions are processed to determine whether the file has been attacked via ransomware.

In some implementations, a potentially affected file that is large will only have a subset of the data from the file divided into chunks. For example, a large file will have data from the file randomly selected for the chunks to calculate the measure of randomness over different portions of the file. The selected chunks will also include at least the header of the file to identify features associated with the header of the file.

Figure 7:
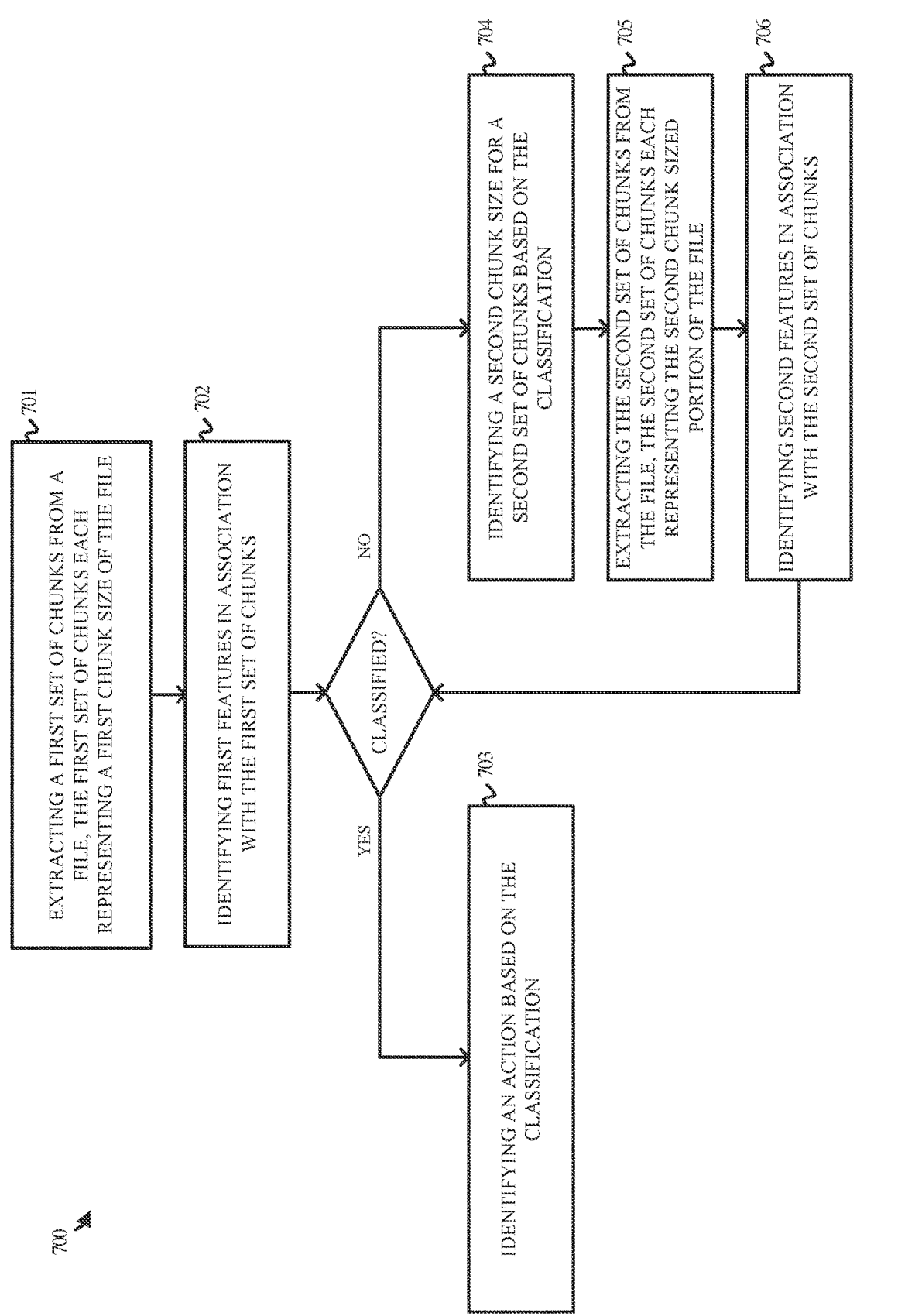
FIG. 7 illustrates a method of modifying chunk sizes for a file to identify ransomware in the file according to an implementation.

FIG. 7 illustrates a method 700 of modifying chunk sizes for a file to identify ransomware in the file according to an implementation. The steps of method 700 are referenced parenthetically in the paragraphs that follow. The steps of method 700 are performed at a computing device to provide a first level of ransomware detection in some examples.

Method 700 includes extracting (701) a first set of chunks from a file, the first set of chunks each representing a first chunk size of the file. The method further includes identifying (702) first features in association with the first set of chunks. For example, following a write of the file, the computing device processes the file to determine whether the file was attacked by ransomware. The processing of the file includes identifying features associated with the file, such as header information for the file, file extension information for the file, or some other feature associated with the file. The features further include measures of randomness for different chunks of the file. For example, the computing device identifies portions of the file that were updated as part of the write and separates the updated portions into eight-kilobyte chunks. Once separated, a randomness measure is identified for each of the chunks. Randomness is measured using entropy, standard deviation techniques, or some other methodology.

After the features are identified in association with the first set of chunks, the computing device further determines whether the file can be classified as safe or attacked by a ransomware application. When the file can be classified, the method includes identifying (703) an action based on the classification. In some implementations, the computing device applies a machine learning model to the features that outputs a determination of whether the file has been attacked. The machine learning model can produce a value in a range of values and the value can be compared to criteria to determine whether the file can be classified using the machine learning model. For example, the machine learning model produces a first value that satisfies criteria to indicate that the file is safe. In response to determining the file is classified as safe, the computing device permits the file to be stored in the data store and provides no remediation operation on the file. In another example, the machine learning model produces a second value that satisfies criteria to indicate the file has been attacked by ransomware. In response to determining the file was attacked, the computing device implements a remediation operation, such as quarantining the file, generating a snapshot of the data store, notifying an administrator of the data store, or providing some other remediation operation.

In some implementations, the first features identified in association with the file do not satisfy criteria to classify the file as safe or attacked. For example, the value generated from the machine learning model will not definitively indicate that the file is safe or attacked. In response to the determination, method 700 further includes identifying (704) a second chunk size for a second set of chunks based on the classification and extracting (705) the second set of chunks from the file, the second set of chunks each representing the second chunk sized portion. As an example, the first set of chunks for the file can include eight kilobytes of data from the file, the eight kilobytes corresponding to data in the file that was modified as part of the write. The second set of chunks for the file can include four kilobytes of data from the file. Thus, the second set of chunks increases the number of chunks from the first set of chunks and provides additional information for the machine learning model. Once the second chunks are identified, method 700 further includes identifying (706) second features in association with the second set of chunks. The second features include at least a measure of randomness associated with the data in each of the chunks, such as an entropy value associated with each of the chunks. In some examples, the features for the second chunks will remain the same for the first features and the second features, such as file extension and header information. After the features are identified in association with the second set of chunks, the method repeats the determination of whether the file is classified as safe or attacked.

In some implementations, the computing device is limited in the size of the chunks that are processed for classifying the file. For example, the computing device initially uses a first chunk size to classify the file and will, if required, use a second, smaller chunk size if a determination cannot be made using the first chunk size. Once the first chunk size and the second chunk size have been used with the machine learning model, the computing device can provide features about the file to a second machine learning model that is different from the locally employed machine learning model. In some examples, the features comprise measures of randomness associated with the file. The measures of randomness can correspond to a different chunk size than the chunk size used in the first machine learning model. For example, the first machine learning model can use eight kilobyte and four-kilobyte chunk sizes, while the second machine learning model (at a cloud service) uses a two-kilobyte chunk size for the features that are input to the model.

FIG. 8A illustrates a timing diagram 800 of operating a cloud environment to identify ransomware in a file from a local device according to an implementation. Timing diagram 800 includes computing system 110, inference engine 150, and user information 152 from computing environment 100 of FIG. 1.

In timing diagram 800, computing system 110 provides features and user identifier information for a modified file at step 1 to inference engine 150 in a cloud computing environment. The features comprise measures of randomness associated with the file, file extension information associated with the file, header information associated with the file, or some other feature associated with the file. In some examples, the features exclude the file itself to maintain privacy and security information associated with the organization supplying the features. In response to receiving the features and user identifier information, the inference engine 150 further obtains additional user information based on the identifier at step 2. The additional user information can indicate file access trends associated with the user, including file types accessed by the user, modification sizes of the user, file access times of the user, or some other file access trend associated with the user. Once the user information is obtained, inference engine 150 applies machine learning model at step 150 to provide a determination of whether the file is safe or attacked by ransomware. The machine learning model is created using files that are known to be affected by ransomware and files that are safe from ransomware. The machine learning model takes in features associated with an unknown file and compares the features as vectors to the features from the known files to make a ransomware determination about the unknown file. Once a determination is made, inference engine 150 provides the determination to computing system 110, permitting an action for the file. The action can permit the file to be stored when the file is deemed safe or can provide a remediation operation when the file is deemed attacked by ransomware.

FIG. 8B illustrates a method 850 of operating a cloud environment to identify ransomware in a file from a local device according to an implementation. The steps of method 850 are referenced parenthetically in the paragraphs that follow with reference to the systems and elements of timing diagram 800.

Method 850 includes receiving (801) features of a file from a second computing device remote from the cloud environment, the features comprising at least a measure of randomness for the file and an identifier for a user associated with a modification to the file. The features include the measure of randomness (e.g., entropy for one or more chunks of the file, standard deviations of data, or some other measure of randomness), header information for the file, file extension information for the file, or some other feature. In some implementations, the features are extracted from the file at an on-premises computing device that provides the storage system for an organization and is provided to the cloud environment when a ransomware determination is required for the file. For example, computing system 110 can extract the feature information and a user identifier associated with the user that modified the file. The features and user identifier information are then provided to inference engine 150 in a cloud environment. The identifier information for the user includes a unique user identifier, a job or occupation identifier for the user, or some other information. The identifier information can further indicate timestamp information associated with the write to the file.

After receiving the features, method 850 further includes identifying (802) user information (or user file access trends) associated with a user that modified the file. The user information includes file access trends associated with the user (file types, timestamps, and the like), file permissions, or some other information associated with the user. The information can be extracted from a database of user information, such as user information 152. For example, the user information can indicate that a user typically accesses files of a first file type during a first period. Method 850 further includes applying (803) a machine learning model to determine whether the file was attacked based on the features and the user information. In some embodiments, the machine learning model is generated from a known corpus of files that include attacked and safe files. The known corpus of files comprises fully encrypted files, partially encrypted files, and non-encrypted files. The files are encrypted using known ransomware applications in some examples. In generating the machine learning model, a system creates the model by first collecting and preprocessing a dataset, then training an algorithm on that data to learn patterns and relationships, adjusting model parameters to minimize the difference between its predictions and actual outcomes. The trained model can then be evaluated on new, unseen data to assess its performance and generalization capabilities. The model uses different factors, such as the randomness, file type, header information, user file access information (e.g., file types and timestamps) to predict whether a file has been attacked by ransomware. Once a determination is made, method 850 further includes communicating (804) a notification to a computing device indicating whether the file was attacked. Thus, inference engine 150 will indicate whether the file is safe or attacked to computing system 110.

For example, when a computing device in an on-premises environment provides the features associated with the file, the cloud environment will apply a machine learning model to the features and the identified user information determine whether the file was attacked. Once a determination is made, the cloud environment provides a notification to the computing device to indicate whether the file was attacked, permitting the computing device to take an action in association with the file. The action can permit the saving of the file when the file is identified as safe or can provide a mitigation operation when the file is determined to be attacked. In some implementations, the machine learning model generates a score in a range of scores. Based on the score, the cloud environment indicates that the file is safe or attacked. For example, if the score is within a first range of values, the cloud environment indicates that the file was attacked, and if the score is within a second range of values, the cloud environment indicates that the file is safe.

FIG. 9A illustrates a timing diagram 900 for using a known dataset in a machine learning environment to generate a machine learning model according to an implementation. Timing diagram 900 includes ransomware 910, known files 912, model creator 914, and machine learning model 916. The elements of timing diagram 900 are implemented in one or more development computing devices, such as servers, desktop computers, and the like.

In timing diagram 910, ransomware 910 represents various ransomware applications that are used to create files that are encrypted using known forms of ransomware. The files are provided from ransomware 910 to known files 912 at step 1. In some implementations, rather than using ransomware 910, a set of known attacked ransomware files are provided from a database. In addition to the files from ransomware 910, known files 912 further includes safe files that have not been attacked by ransomware. The files comprise document files, database files, or some other files. From the known files, model creator 914 processes the files at step 2 and generates machine learning model 916 at step 3. Machine learning model 916 is a mathematical representation or algorithm that is trained on data to make predictions or decisions without being explicitly programmed. Specifically, machine learning model 916 is trained on known files 912 that are known to either be attacked or safe, wherein features of the attacked files are identified to be applied to unknown files (attacked or safe). Machine learning model 916 learns patterns and relationships from the provided data, enabling it to generalize and make accurate predictions on new, unseen data. The machine learning model is deployed at an on-premises computing device with a datastore or deployed remotely at a cloud computing service that comprises one or more computing devices to determine whether a file is attacked by ransomware.

In at least one embodiment, once machine learning model 916 is generated, features associated with a new unknown file are identified. The unknown file corresponds to a modified file in association with a datastore for an organization. For example, when a user attempts to write the file, the file will be identified for processing by machine learning model 916. After the file is identified, features of the file are extracted and input into machine learning model 916. Machine learning model 916 outputs a value that is compared to criteria that indicates whether the file is safe or attacked. Based on the determination, an action is taken on the file. In some examples, multiple machine learning models are generated. The first machine learning model comprises a first complexity that is less than the complexity of a second machine learning model. The first machine learning model can be deployed at a first computing device (e.g., on-premises computing device), while the second machine learning model is deployed on second computing resources (e.g., cloud computing devices). The second machine learning model uses enhanced or additional features associated with the file to determine whether the file is safe or attacked.

In some implementations, in addition to using the feature information from the known files, machine learning model 916 is generated based on file access trends associated with users. The file access trends comprise time stamps associated with file access, file types associated with different users, modification size associated with users, or some other file access trend. For example, the trends could be used by the machine learning model to identify variances in user activity with a file that could potentially correspond to a ransomware attack.

FIG. 9B illustrates a method 950 of using a known dataset in a machine learning environment to identify ransomware features according to an implementation. The steps of method 950 are referenced parenthetically in the paragraphs that follow with reference to the elements of timing diagram 900 of FIG. 9A.

Method 950 includes identifying (901) a set of files, the set of files comprising attacked and safe files (with indicators as such), wherein the set of files includes unencrypted files, partially encrypted files, and fully encrypted files. The set of files are represented by known files 912. Method 950 further includes identifying (902) features associated with the set of files, the features including at least measures of randomness for the set of files. In some implementations, the measures of randomness include, for each of the files, entropy values associated with different chunks of the file. For example, a file may be divided into eight-kilobyte chunks and a calculation performed to determine the entropy associated with each of the chunks. Other randomness calculations can be performed on the chunks of the file, such as standard deviation determinations or some other randomness calculation associated with the data values in the file. In addition to the randomness values, the features may further include header information associated with each of the files, file extension information associated with each of the files, or some other information associated with each of the files.

After the features are extracted from the files, method 950 further includes determining (903) relationships between the features and whether a file of the set of files was attacked. For a file that was attacked by ransomware, the method will identify features that likely indicate the file was attacked, including the measures of randomness, file extension, header information, and the like. Similarly, for a file that was safe or not attacked by ransomware, the method will identify feature relationships that indicate the file was safe, including the measures of randomness, file extension, header information, and the like. Method 950 further includes generating (904) a machine learning model that outputs a determination of whether a new file has been attacked based at least on the relationships. The machine learning model is a computational algorithm or statistical model that learns patterns from data and makes predictions or decisions without being explicitly programmed. It uses training data (i.e., the set of files) to optimize its parameters and improve its ability to generalize to new, unseen data. Specifically, the parameters include the relationships between the features identified in the file and an indication of whether the file was attacked. The operations are performed using model creator 914.

In some implementations, the machine learning environment generates the set of files by implementing ransomware on a portion of the files (e.g., ransomware 910). For example, the machine learning model provides files to a virtual machine or other environment affected by ransomware, permitting the files be at least partially encrypted by the ransomware. Additionally, the set of files comprises files that are known to be safe and were not deliberately affected by the ransomware. In some examples, the machine learning environment uses different types of known ransomware, wherein different ransomware is applied to the files based on the ransomware being known, based on the popularity of the ransomware, or based on some other factor. For example, the machine learning environment will attack more files from a more popular ransomware version than files from a less popular ransomware version. Advantageously, this permits additional relationships and features to be identified in association with the more prevalent ransomware applications for the machine learning model. However, less prevalent ransomware can also be processed to identify features or relationships associated with an affected file from the ransomware.

In some implementations, the machine learning environment generates multiple models that support different levels of ransomware detection. For example, a first level of ransomware detection uses first computing resources, while a second level of ransomware detection uses second computing resources. The first computing resources will support a first complexity of ransomware detection. The first complexity includes first factors or relationships that identify the most frequent types of ransomwares. For example, the first level ransomware detection will attempt to identify whether a file is attacked by a set of the most frequently used ransomwares based on randomness values identified in files, file extension information in files, header information of files, or some other information identified from the test set of files. If the first level of ransomware detection and the first machine learning model can determine whether an attack is detected for a file (i.e., satisfies criteria), then the first level of ransomware detection initiates an operation on the file. The operation will correspond to whether the file was identified as safe or attacked.

If the first level of ransomware detection is incapable of determining whether a file is attacked, the second level of ransomware and second machine learning model is applied to the file. The second machine learning model uses additional computing resources and relationship factors to determine whether the file was attacked. The additional features of the file include randomness values, file extension information, header information, or some other features derived from the file that provide additional information about the file. In some implementations, the second machine learning model also considers user behavior information associated with the file and potentially variant modifications to a file that would indicate a ransomware attack. The user behavior information considers typical user interactions (access time, modifications, etc.) with a file that can be used to determine when the writes to a file deviate from the expected modifications. The information associated with the user includes file accessibility of the user, modification size information for the user, file access time information for the user, or some other trend associated with file access of the user. For example, a user that makes an inordinately large modification to a file may trigger an attack determination along with randomness measurements or other features associated with the file. The second level of ransomware detection and second machine learning model uses different or additional features associated with the file to make the determination of whether a file is attacked. The first level of ransomware detection identifies the most frequent ransomware based on the most likely features associated with ransomware (e.g., randomness measurements from a file), while the second level of ransomware detection identifies lest frequently used ransomware based on additional features that are incapable of being processed by the computing resources of the first level of ransomware.

Figure 10:
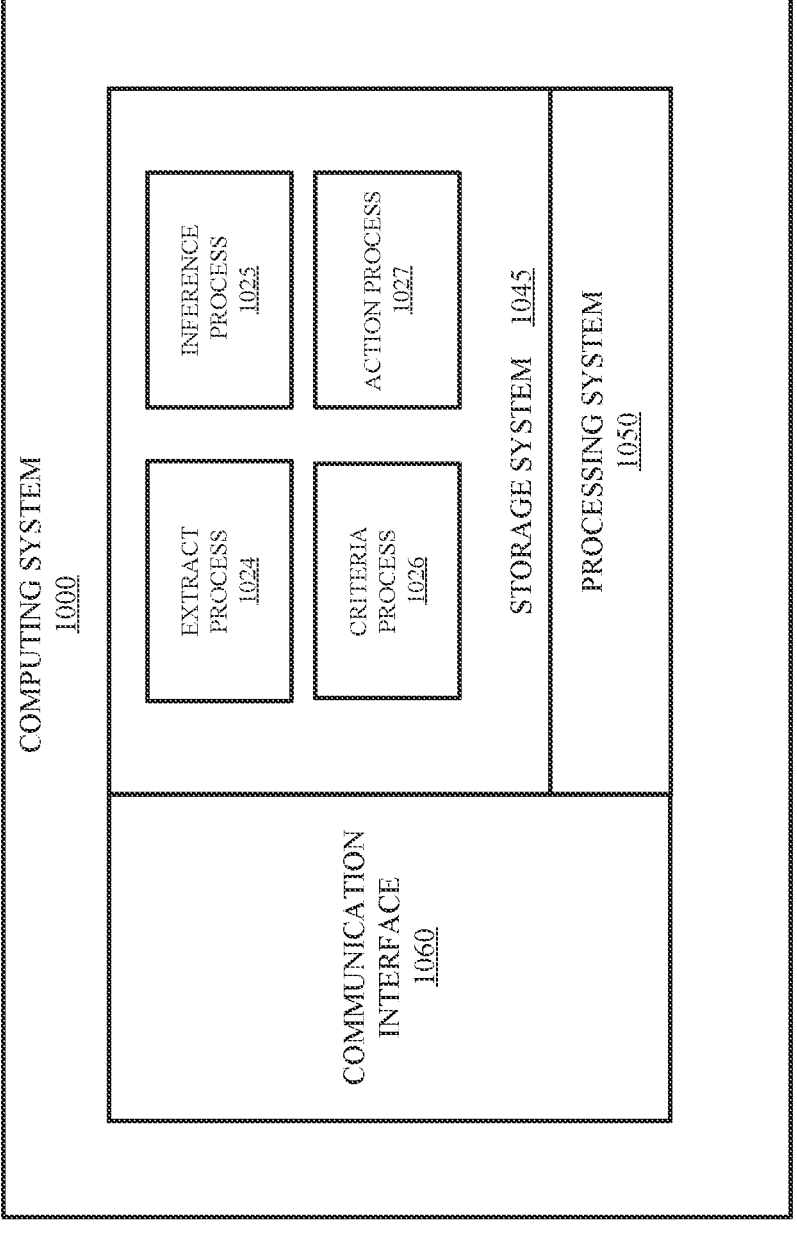
FIG. 10 illustrates a computing system to support compute optimized multi-level ransomware detection according to an implementation.

FIG. 10 illustrates a computing system 1000 to support compute optimized multi-level ransomware detection according to an implementation. Computing system 1000 is representative of any computing system or systems with which the various operational architectures, processes, scenarios, and sequences disclosed herein for a data storage computing system. Computing system 1000 is an example of data storage computing system 110 of FIG. 1, although other examples may exist. Computing system 1000 includes storage system 1045, processing system 1050, and communication interface 1060. Processing system 1050 is operatively linked to communication interface 1060 and storage system 1045. Communication interface 1060 may be communicatively linked to storage system 1045 in some implementations. Computing system 1000 may further include other components such as a battery and enclosure that are not shown for clarity.

Communication interface 1060 comprises components that communicate over communication links, such as network cards, ports, radio frequency, processing circuitry and software, or some other communication devices. Communication interface 1060 may be configured to communicate over metallic, wireless, or optical links. Communication interface 1060 may be configured to use Time Division Multiplex (TDM), Internet Protocol (IP), Ethernet, optical networking, wireless protocols, communication signaling, or some other communication format—including combinations thereof. In some implementations, communication interface 1060 communicates with a cloud computing system or environment to provide features associated with a file and receive a determination of whether the file is attacked by ransomware.

Processing system 1050 comprises microprocessor (e.g., at least one processor) and other circuitry that retrieves and executes operating software from storage system 1045. Storage system 1045 may include volatile and nonvolatile, removable, and non-removable media implemented in any method or technology for storage of information, such as computer readable instructions, data structures, program modules, or other data. Storage system 1045 may be implemented as a single storage device but may also be implemented across multiple storage devices or sub-systems. Storage system 1045 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 1050 is typically mounted on a circuit board that may also hold the storage system. The operating software of storage system 1045 comprises computer programs, firmware, or some other form of machine-readable program instructions. The operating software of storage system 1045 comprises extract process 1024, interference process 1025, criteria process 1026, and action process 1027. The operating software on storage system 1045 may further include an operating system, utilities, drivers, network interfaces, applications, or some other type of software. When read and executed by processing system 1050 the operating software on storage system 1045 directs computing system 1000 to provide the multi-level ransomware detection described herein in FIG. 1-9.

In one implementation, extract process directs processing system 1050 to determine first features in association with a file at a first computing device, wherein the first features comprise at least entropy information associated with the file. Once determined, inference process 1025 directs processing system 1050 to determine a confidence score indicative of potential maliciousness in the file based on the first features and criteria process 1026 directs processing system 1050 to determine whether the confidence score satisfies one or more criteria at the first device.

When the confidence score satisfies the one or more criteria, action process 1027 directs processing system 1050 to implement an action based on whether the file is determined to be affected by ransomware or unaffected by ransomware (e.g., block file storage, notify administrator, etc.). When the confidence score does not satisfy the one or more criteria the first computing device can communicate with a cloud service capable of providing further processing and ransomware operations on the process. Specifically, when the criteria are not satisfied, action process 1027 directs processing system 1050 to identify second features of the file, communicate the second features to the cloud service operating on one or more second computing devices, receive a threat determination from the cloud service, and implement an action based on the threat determination.

In some implementations, inference process 1025 on the first device analyzes a first set of features that is different and less than the set of features analyzed by the cloud service. In some implementations, the first features comprise a first granularity of chunks associated with the file, while the second features comprise a second granularity of chunks. The second granularity of chunks permit the cloud service to identify additional patterns and traits within the file and can further be combined with other additional features to compare the encryption of the current file with previously processed and known ransomware files.

In some examples, the chunk size is variable when applying a first level of ransomware detection. For example, during a first pass on a file by the first level of ransomware detection, a first set of chunks are identified in the modified portions of the file. The first set of chunks of a first size, such as 8 kilobytes. From the chunks, extract process 1024, determines measures of randomness associated with each of the chunks, such as a measure of entropy associated with each of the chunks. Extract process 1024 can further identify other features of the file, such as file name, file extension, modification size to the file, or some other feature associated with the file. The features, including the measures of randomness, are applied by inference process 1025 to determine whether the file has been attacked by ransomware. When a determination can be made as to whether the file was attacked or is safe, an action is taken on the file without further processing by the first level of ransomware detection.

When a determination cannot be made as to whether the file was attacked or safe, extract process 1024 identifies a smaller chunk size than the first chunk size and determines measures of randomness associated with the smaller chunks of the file. Inference process 1025 applies the machine learning model to the features, including the new measures of randomness, to determine whether the file has been attacked or is safe. In some implementations, the operation is repeated if required until a smallest chunk size has been processed. If a determination is not made at computing system 1000, then second features are identified with the file and provided to a second level of ransomware detection that can be implemented in a cloud computing environment. In some implementations, the first level of ransomware uses a first size or granularity of chunks (e.g., eight kilobytes and four kilobytes), while the second level of ransomware uses a second size or granularity of chunks (e.g., two kilobytes).

Figure 11:
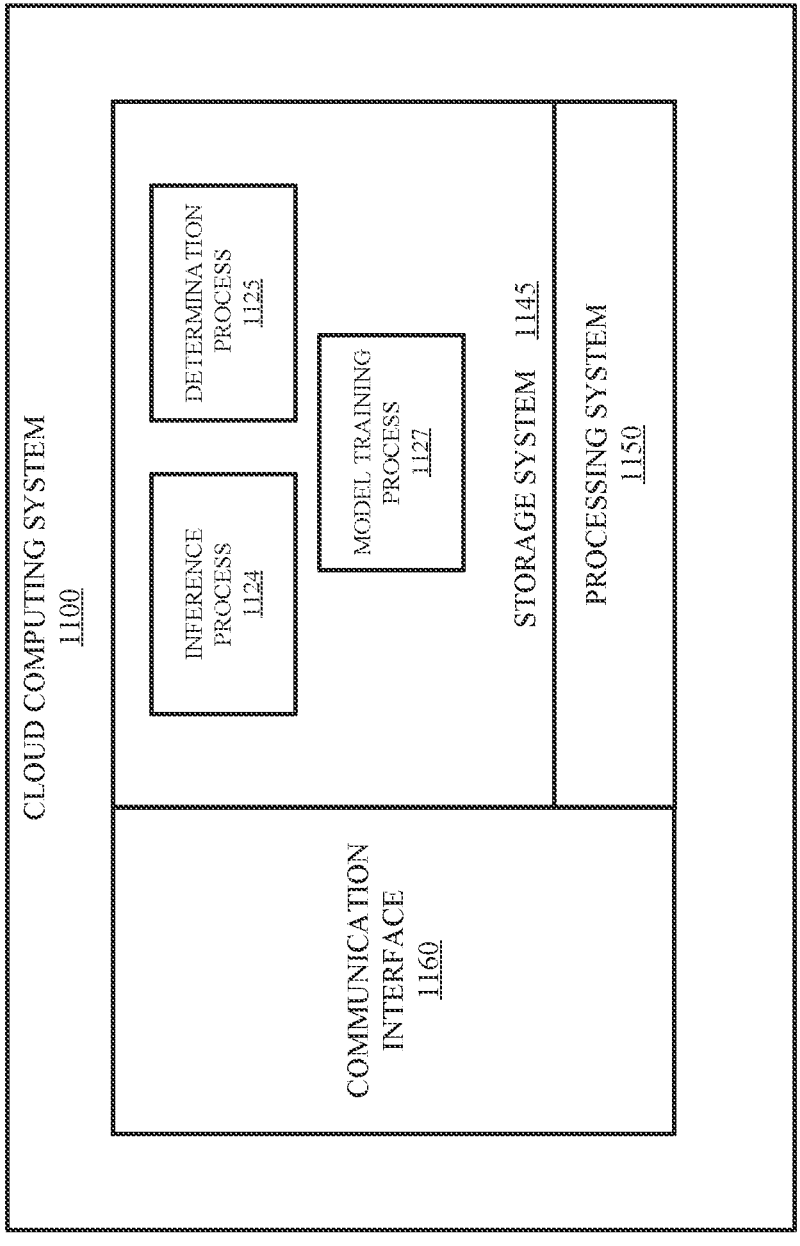
FIG. 11 illustrates a cloud computing system to support compute optimized multi-level ransomware detection according to an implementation.

FIG. 11 illustrates a cloud computing system 1100 to support compute optimized multi-level ransomware detection according to an implementation. Computing system 1100 is representative of any computing system or systems with which the various operational architectures, processes, scenarios, and sequences disclosed herein for a cloud computing system can be implemented. Computing system 1100 is an example of cloud computing system 105 of FIG. 1, although other examples may exist. Computing system 1100 includes storage system 1145, processing system 1150, and communication interface 1160. Processing system 1150 is operatively linked to communication interface 1160 and storage system 1145. Communication interface 1160 may be communicatively linked to storage system 1145 in some implementations. Computing system 1100 may further include other components such as a battery and enclosure that are not shown for clarity.

Communication interface 1160 comprises components that communicate over communication links, such as network cards, ports, radio frequency, processing circuitry and software, or some other communication devices. Communication interface 1160 may be configured to communicate over metallic, wireless, or optical links. Communication interface 1160 may be configured to use Time Division Multiplex (TDM), Internet Protocol (IP), Ethernet, optical networking, wireless protocols, communication signaling, or some other communication format—including combinations thereof. In some implementations, communication interface 1160 is used to communicate with one or more on-premises data storage computing systems to receive features associated with files and provide an indication of whether the file was attacked by ransomware.

Processing system 1150 comprises microprocessor (e.g., at least one processor) and other circuitry that retrieves and executes operating software from storage system 1145. Storage system 1145 may include volatile and nonvolatile, removable, and non-removable media implemented in any method or technology for storage of information, such as computer readable instructions, data structures, program modules, or other data. Storage system 1145 may be implemented as a single storage device but may also be implemented across multiple storage devices or sub-systems. Storage system 1145 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 1150 is typically mounted on a circuit board that may also hold the storage system. The operating software of storage system 1145 comprises computer programs, firmware, or some other form of machine-readable program instructions. The operating software of storage system 1145 comprises inference process 1124, determination process 1125, and model training process 1127. The operating software on storage system 1145 may further include an operating system, utilities, drivers, network interfaces, applications, or some other type of software. When read and executed by processing system 1150 the operating software on storage system 1145 directs computing system 1100 to provide the multi-level ransomware detection associated with a cloud computing system described herein in FIG. 1-9.

In one implementation, inference process 1124 directs processing system 1150 to receive features of a file from another computing site, such as an on-premises computing site, and apply ransomware detection to the features. The features comprise randomness values associated with the file, file extension information, file header information, user identifier information associated with the user that generated the modification to the file, or some other feature of the file. In some implementations, the features are provided only in association with portions of the file that were modified. In applying the ransomware detection, inference process 1124 uses a machine learning model that is different from the second machine learning model employed by the on-premises computing site. The machine learning model uses additional features or different relationships of the file to determine whether the file is attacked by ransomware. Specifically, cloud computing system 1100 includes additional complexity and relationship information to determine whether the file is attacked.

After applying the ransomware detection, determination process 1125 directs processing system 1150 to determine whether the file is attacked or safe. In some implementations, the file is assigned a score using the machine learning model of cloud computing system 1100. From the score, determination process 1125 determines whether the file is attacked or safe. For example, a score within a first range of values will be classified as attacked, while a score in a second set of values will be safe. In some implementations, more than two classifications are provided by determination process 1125. For example, a first determination will indicate that a file is safe, a second determination will indicate that the file is attacked, and a third indication will notify an administrator that further analysis should be provided on the file. Once a determination is made on the file, the determination is provided to an on-premises computing system to implement an action in association with the determination. The action can permit the file to be saved, generate a snapshot of the file and/or database, quarantine the file, or provide some other operation based on the determination.

Although demonstrated as executing in the cloud, in some implementations, the second level of ransomware detection can be employed in the on-premises environment or another data center of an organization. For example, first computing resources are allocated to providing the first level of ransomware detection, while second resources of the same organization are used to provide the second level of ransomware detection. Each of the levels use a different machine learning model to process the features of the file and the second level of ransomware detection uses more complex or additional features than the first level of ransomware detection.

In some implementations, in addition to or in place of the ransomware detection processes using features of a file, model training process 1127 directs processing system 1150 to identify a set of training files that includes safe files as well as files encrypted by ransomware. Model training process 1127 further identifies features associated with the set of files and features at least include measures of randomness associated with the set of files. Model training process 1127 also determines relationships between the features and whether a file in the set of files was attacked and generates a machine learning model that outputs a determination of whether a new file has been attacked based at least on the relationships.

In one example, the set of files includes unencrypted files, partially encrypted files, and fully encrypted files. In some examples, the attacked files are generated using known ransomware, wherein a virtual machine or some other service executing the ransomware encrypts the files. In other examples, the attacked files are provided from a database of known attacked files. Once the set of files are generated, features are identified in the files, including measures of randomness, header information, file extension information, or some other information in association with each of the files. Features associated with attacked files are used in generating the machine learning model to identify newly attacked files.

In some implementations, model training process 1127 generates multiple machine learning models. A first machine learning model provides a first level of ransomware detection, wherein the first machine learning model attempts to identify ransomware attacks using a first set of features and relationships from the known attacked files. The first level of ransomware detection is used to identify the most frequently used ransomware applications. A second machine learning model provides a second level of ransomware detection, wherein the second machine learning model uses additional features or relationships associated with ransomware to identify ransomware attacks with less frequently used features. In some examples, the second level of ransomware detection uses additional user traits to determine whether the file was attacked and incorporates the user traits into the machine learning model. The user traits comprise file modification sizes associated with the user, file access times associated with the user, file types accessed by the user, or some other trait associated with the user. In some implementations, the on-premises computing system provides a user identifier associated with the modification to the file and cloud computing system 1100 identifies the file access traits or trends associated with the user. The traits are provided by one or more databases in some examples.

Although demonstrated as implemented in cloud computing system 1100, model training process 1127 can be implemented in any computing system, including on-premises computing systems, workstations, or some other computing system. Once the machine learning model is generated, the machine learning model is deployed to the required computing system. The different machine learning models can be deployed on-premises to provide a first level of ransomware detection and in the cloud to provide a second level of ransomware detection.

Although demonstrated in the examples of FIGS. 1-11 using files, similar operations can also be performed in object storage where an object in object storage is analyzed to identify whether the object has been attacked by ransomware. Object storage is a type of data storage architecture that manages data as objects, as opposed to the traditional file system hierarchy or block storage used in many storage area networks (SANs) and file servers. In object storage, data is bundled with its metadata and a unique identifier to form an object. These objects are stored in a flat address space, and each object can be accessed individually through a unique identifier.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
generating training data by chunking each file, of a set of files, into first chunks having a first size and second chunks having a second size, wherein the training data set includes files that are unencrypted, partially encrypted, and fully encrypted;
computing features for each of the first chunks and the second chunks, wherein the features comprise at least measures of randomness; and
training a machine learning model to identify files as safe or unsafe based on the training data, the features, and labels indicative of which files are attacked by ransomware.

2. The method of claim 1, wherein the measures of randomness includes one or more measures of entropy.

3. The method of claim 1, wherein the features further include file type information and header information associated with the set of files.

4. The method of claim 1 further comprising:
training a second machine learning model to identify the files as safe or unsafe based on more complex relationships in the features than the machine learning model, the second machine model is configured to be applied when the machine learning model outputs an unknown determination of whether a processed file is safe or unsafe.

5. The method of claim 4, wherein the machine learning model is designed for on-premises deployment, and wherein the second machine learning model is designed for cloud-based deployment.

6. The method of claim 1 further comprising synthetically generating the training data by applying one or more ransomware software to a portion of the set of files to create the partially encrypted and fully encrypted files in the training data set and labeling each of those files as attacked by ransomware.

7. The method of claim 1 further comprising:
identifying user file access trends for a user; and
wherein the machine learning model is further trained to identify file access trends that differ from the user file access trends.

8. A computing apparatus comprise
a storage system;
a processing system operatively coupled to the storage system;

program instructions stored on the storage system that, when executed by the processing system, direct the computing apparatus to:
chunk files in a set of files into first chunks and second chunks to create training data, wherein the first chunks are of a different size than the second chunks, and wherein the set of files includes files that are unencrypted, files that are partially encrypted, and files that are fully encrypted;
compute measures of randomness the first chunks and the second chunks; and
train a machine learning model to identify whether a file is safe or unsafe based on the measures of randomness and labels indicative of which of the first chunks and second chunks are attacked by ransomware.

9. The computing apparatus of claim 8, wherein the measures of randomness comprise one or more measures of entropy for the first chunks and the second chunks.

10. The computing apparatus of claim 8, wherein the machine learning model is also trained based on file type information and/or header information of the set of files.

11. The computing apparatus of claim 8, wherein the program instructions further direct the computing apparatus to:
train a second machine learning model based on the measures of randomness and the labels, wherein the second machine learning model is more complex than the first machine learning model.

12. The computing apparatus of claim 11, wherein the program instructions further direct the computing apparatus to:
deploy the machine learning model in an on-premises computing environment; and
deploy the second machine learning model in a cloud environment.

13. The computing apparatus of claim 8, wherein identifying the set of files comprises applying ransomware software to a subset of files in the set of files.

14. The computing apparatus of claim 8, wherein the program instructions further direct the computing apparatus to:
identify user file access trends for a user; and
wherein the machine learning model is further trained based on access trends that differ from the user file access trends in association with a ransomware attack.

15. One or more non-transitory computer readable storage media having program instructions stored thereon that, when executed by at least one processor of a computing device, direct the computing device to:
identify a set of files including unencrypted files, partially encrypted files, and fully encrypted files;
identify first relationships between first features of first-sized chunks of the set of files and second relationships between second features of second-sized chunks of the set of files, wherein the first and second features comprise at least measures of randomness associated the first-sized and second-sized chunks; and
generate a machine learning model that outputs a determination of whether a new file has been attacked based on the first and second relationships and indications of which of the first and second relationships are associated with encrypted or partially encrypted files.

16. The one or more non-transitory computer readable storage media of claim 15, wherein the measures of randomness comprise one or more measures of entropy.

17. The one or more non-transitory computer readable storage media of claim 15, wherein the first and second features further comprise file type information and header information associated with the set of files.

18. The one or more non-transitory computer readable storage media of claim 15, wherein the program instructions further direct the computing device to:

generate a second machine learning model that outputs a second determination of whether the new file has been attacked based more complex relationships than the first and second relationships.

19. The one or more non-transitory computer readable storage media of claim 15, wherein the indications comprise labels indicating whether a file in the set of files has been attacked by ransomware.

20. The one or more non-transitory computer readable storage media of claim 15, wherein ransomware software is used to generate the partially encrypted files and the fully encrypted files.

* * * * *